(12) United States Patent
Bolyn

(10) Patent No.: US 6,233,665 B1
(45) Date of Patent: **\*May 15, 2001**

(54) MAPPING SHARED DRAM ADDRESS BITS BY ACCESSING DATA MEMORY IN PAGE MODE CACHE STATUS MEMORY IN WORD MODE

(75) Inventor: Philip C. Bolyn, Norristown, PA (US)

(73) Assignee: Unisys Corporation, Blue Bell, PA (US)

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/862,987

(22) Filed: May 27, 1997

(51) Int. Cl.[7] .................................................. G06F 12/00
(52) U.S. Cl. ........................ 711/168; 711/118; 711/144; 711/145; 711/156; 711/172; 711/147
(58) Field of Search .................................... 711/147, 172, 711/145, 156, 144, 702, 3, 118, 202, 168; 365/238; 710/19

(56) References Cited

U.S. PATENT DOCUMENTS

| | | | |
|---|---|---|---|
| 4,658,350 | \* | 4/1987 | Eggebrecht et al. ................. 395/846 |
| 5,255,380 | \* | 10/1993 | Berkovich .............................. 395/859 |
| 5,301,278 | \* | 4/1994 | Bowater et al. ........................... 711/5 |
| 5,446,844 | \* | 8/1995 | Steckler et al. ....................... 711/118 |
| 5,572,692 | \* | 11/1996 | Murdoch et al. ......................... 711/5 |
| 5,594,887 | \* | 1/1997 | Osaka .................................... 711/144 |
| 5,682,515 | \* | 10/1997 | Lau et al. .............................. 711/118 |
| 5,740,400 | \* | 4/1998 | Bowles ................................. 711/144 |
| 5,765,188 | \* | 6/1998 | Cowell ................................. 711/115 |
| 5,784,700 | \* | 7/1998 | Chen .................................... 711/172 |
| 5,829,022 | \* | 10/1998 | Watanabe et al. .................... 711/118 |
| 6,049,856 | \* | 4/2000 | Bolyn ................................... 711/168 |

\* cited by examiner

Primary Examiner—Tuan V. Thai
(74) Attorney, Agent, or Firm—Rocco L. Adornato; Mark T. Starr; Sterne, Kessler, Goldstein & Fox PLLC

(57) ABSTRACT

A memory system includes a data memory for storing data and applications software and a distinct cache status memory for storing status information regarding the data memory. A memory controller generates timing and control signals for accessing the data memory in a page mode while concurrently accessing the cache status memory in a word mode. In the preferred embodiment, the data memory is accessed in a four word per page mode so that the memory capacity of the associated cache status memory can be up to seventy five percent smaller than the data memory. In order to conserve pins on the memory controller, the cache status memory shares a substantial portion of the address lines which are received by the data memory. Supplemental cache status address lines are generated by programmable control logic, which may be incorporated into the memory controller. Programmable control logic generates supplemental address lines based on the maximum number of data memory modules, the size of the largest on data memory modules and the number of cache status columns so that any of a variety of data memory and cache status memory configurations may be employed.

19 Claims, 19 Drawing Sheets

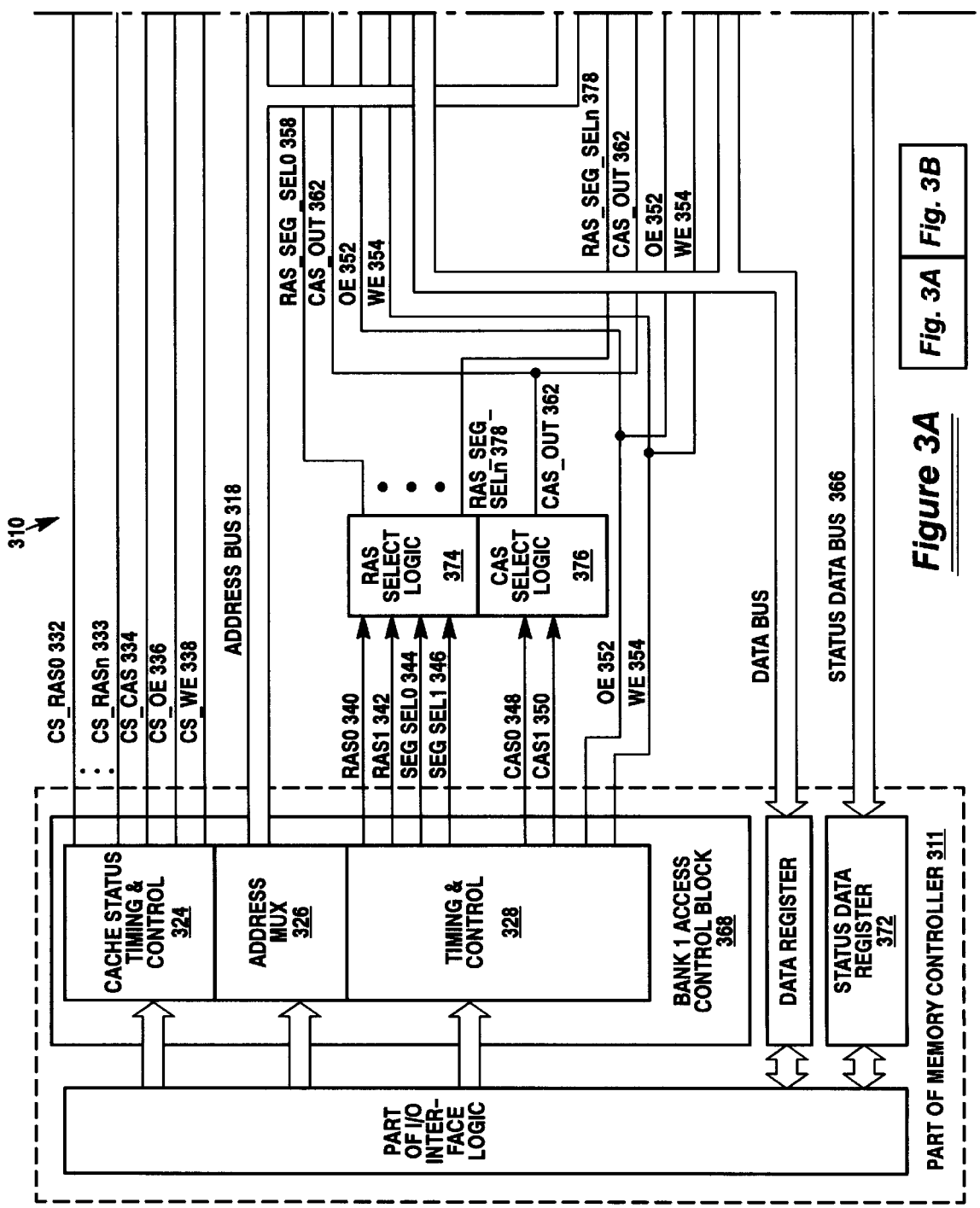

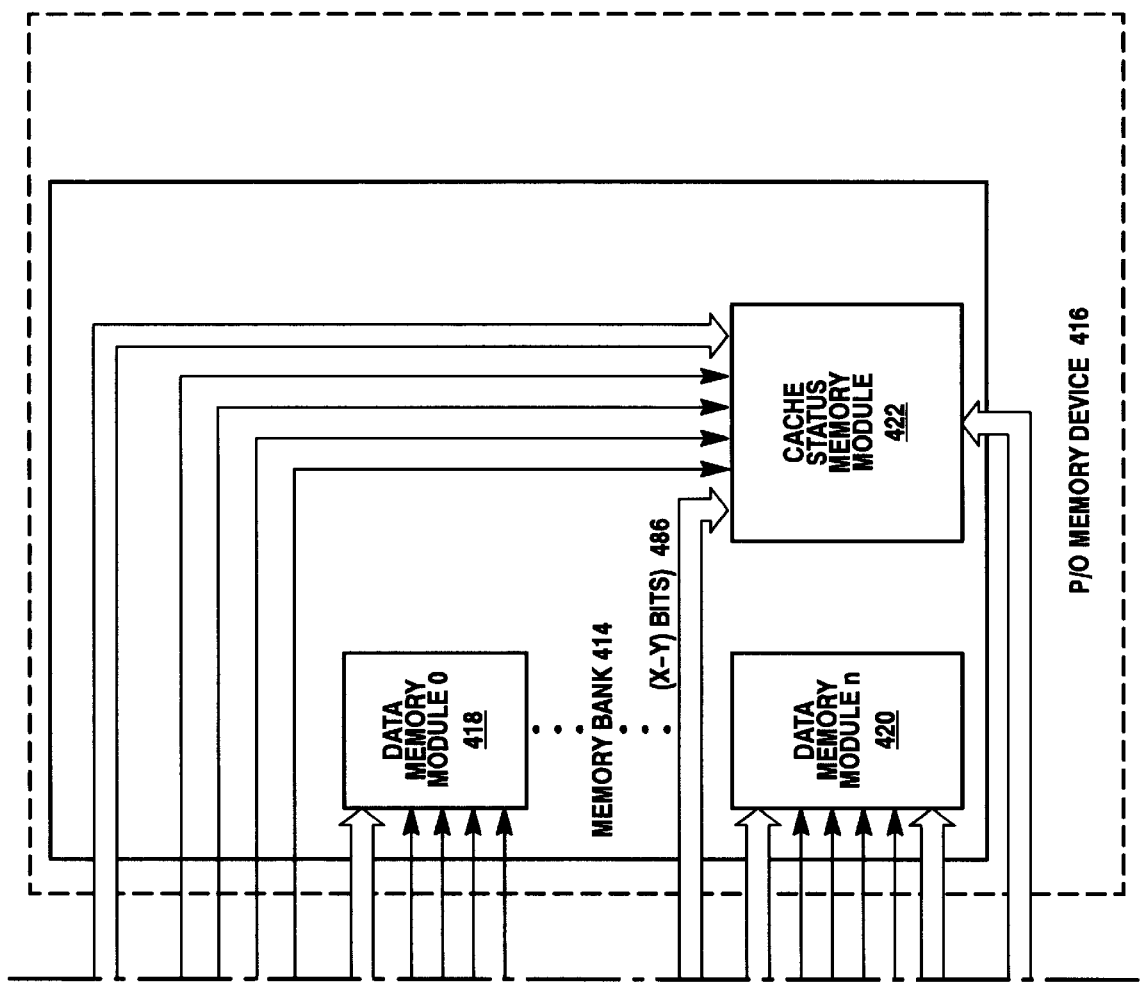

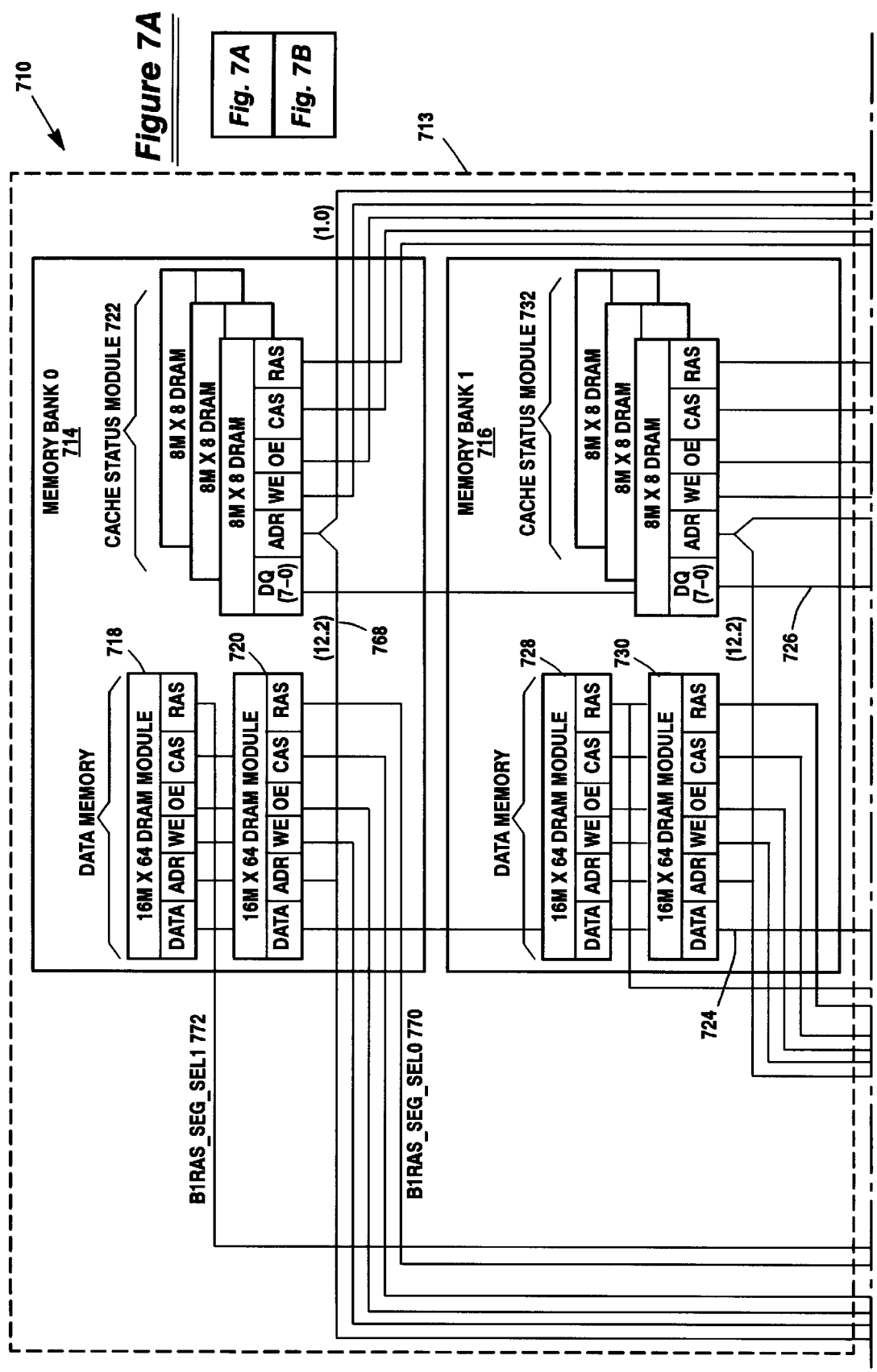

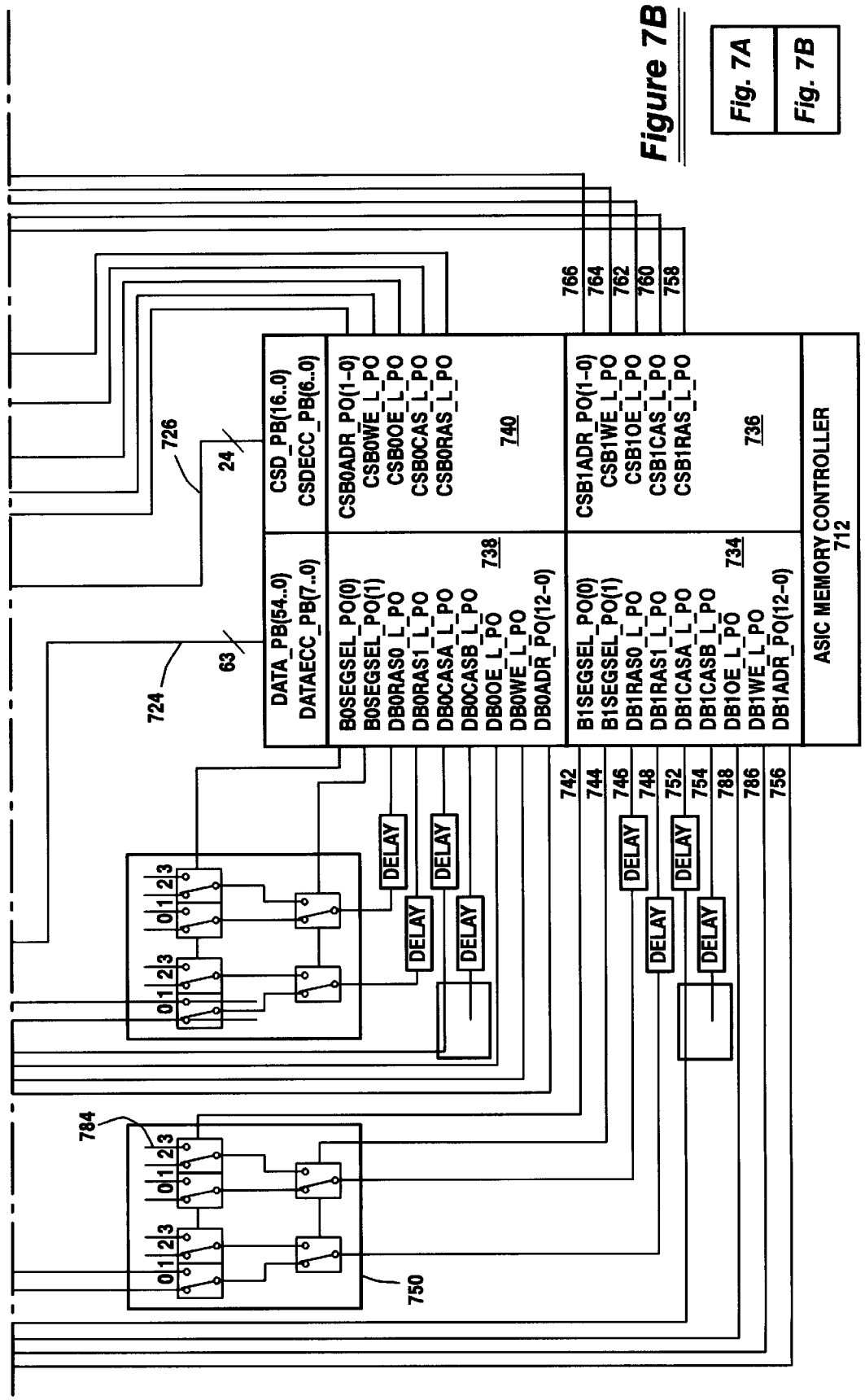

| MAX D.M. PROD | OUTPUT | |
|---|---|---|
| | 1 | 2 |
| 1 | CSX 1 | CSX 0 |
| 2 | CSX 1 | S0 |
| 3 OR 4 | S1 | S0 |

CS_ADR_MUX2
TABLE 3

| NO. CS DRAM COL. | OUTPUT | |
|---|---|---|
| | 1 | 0 |
| 9 | HCM 0 | HCM 1 |
| 10 | HCM 1 | HCM 2 |
| 11 | HCM 2 | HCM 3 |
| 12 | HCM 3 | HCM 4 |
| 13 | HCM 4 | HCM 5 |

CS_ADR_MUX1 (CSX)
TABLE 2

| DATA MEM SIZE | HCM OUTPUT | | | | | |
|---|---|---|---|---|---|---|
| | 5 | 4 | 3 | 2 | 1 | 0 |
| 64M | 20 | 21 | 22 | 23 | 24 | 25 |
| 32M | 19 | 20 | 21 | 22 | 23 | 24 |
| 16M | 18 | 19 | 20 | 21 | 22 | 23 |
| 8M | 17 | 18 | 19 | 20 | 21 | 22 |
| 4M | 16 | 17 | 18 | 19 | 20 | 21 |
| 2M | 15 | 16 | 17 | 18 | 19 | 20 |
| 1M | 14 | 15 | 16 | 17 | 18 | 19 |

HI_COL_MUX (HCM)
TABLE 1

*Figure 11*

TABLE 4

| COMMON DATA AND CS DRAM ROW ADDRESS | | | | | | | | | | | | | |
|---|---|---|---|---|---|---|---|---|---|---|---|---|---|
| 12 | 11 | 10 | 9 | 8 | 7 | 6 | 5 | 4 | 3 | 2 | 1 | 0 | — 1210 |
| 21 | 20 | 19 | 18 | 17 | 16 | 15 | 14 | 13 | 12 | 11 | 10 | 9 | — 1212 |

MAXIMUM CONFIGURABLE DATA SEGMENTS = 1

| # OF CS DRAM COLS. | COMMON DATA AND CS DRAM COLUMN ADDRESS | | | | | | | | | | | DATA DRAM COL ADDRESS | | CS DRAM COL ADDRESS | | |
|---|---|---|---|---|---|---|---|---|---|---|---|---|---|---|---|---|
| | 12 | 11 | 10 | 9 | 8 | 7 | 6 | 5 | 4 | 3 | 2 | 1 | 0 | 1 | 0 | |
| 9 | | | 16 | 17 | 18 | 19 | 8 | 7 | 6 | 5 | 4 | 3 | 2 | 1 | 0 | 19 | 18 | 1M DATA DRAM |
| 10 | | | 16 | 17 | 18 | 19 | 8 | 7 | 6 | 5 | 4 | 3 | 2 | 1 | 0 | 18 | 17 | |
| 11 | | | 16 | 17 | 18 | 19 | 8 | 7 | 6 | 5 | 4 | 3 | 2 | 1 | 0 | 17 | 16 | |
| 12 | | | 16 | 17 | 18 | 19 | 8 | 7 | 6 | 5 | 4 | 3 | 2 | 1 | 0 | 16 | 15 | |
| 13 | | | 16 | 17 | 18 | 19 | 8 | 7 | 6 | 5 | 4 | 3 | 2 | 1 | 0 | 15 | 14 | |
| 9 | | | 17 | 18 | 19 | 20 | 8 | 7 | 6 | 5 | 4 | 3 | 2 | 1 | 0 | 20 | 19 | 2M DATA DRAM |
| 10 | | | 17 | 18 | 19 | 20 | 8 | 7 | 6 | 5 | 4 | 3 | 2 | 1 | 0 | 19 | 18 | |
| 11 | | | 17 | 18 | 19 | 20 | 8 | 7 | 6 | 5 | 4 | 3 | 2 | 1 | 0 | 18 | 17 | |
| 12 | | | 17 | 18 | 19 | 20 | 8 | 7 | 6 | 5 | 4 | 3 | 2 | 1 | 0 | 17 | 16 | |
| 13 | | | 17 | 18 | 19 | 20 | 8 | 7 | 6 | 5 | 4 | 3 | 2 | 1 | 0 | 16 | 15 | |
| 9 | | | 18 | 19 | 20 | 21 | 8 | 7 | 6 | 5 | 4 | 3 | 2 | 1 | 0 | 21 | 20 | 4M DATA DRAM |
| 10 | | | 18 | 19 | 20 | 21 | 8 | 7 | 6 | 5 | 4 | 3 | 2 | 1 | 0 | 20 | 19 | |
| 11 | | | 18 | 19 | 20 | 21 | 8 | 7 | 6 | 5 | 4 | 3 | 2 | 1 | 0 | 19 | 18 | |
| 12 | | | 18 | 19 | 20 | 21 | 8 | 7 | 6 | 5 | 4 | 3 | 2 | 1 | 0 | 18 | 17 | |
| 13 | | | 18 | 19 | 20 | 21 | 8 | 7 | 6 | 5 | 4 | 3 | 2 | 1 | 0 | 17 | 16 | |
| 9 | | | 19 | 20 | 21 | 22 | 8 | 7 | 6 | 5 | 4 | 3 | 2 | 1 | 0 | 22 | 21 | 8M DATA DRAM |
| 10 | | | 19 | 20 | 21 | 22 | 8 | 7 | 6 | 5 | 4 | 3 | 2 | 1 | 0 | 21 | 20 | |
| 11 | | | 19 | 20 | 21 | 22 | 8 | 7 | 6 | 5 | 4 | 3 | 2 | 1 | 0 | 20 | 19 | |
| 12 | | | 19 | 20 | 21 | 22 | 8 | 7 | 6 | 5 | 4 | 3 | 2 | 1 | 0 | 19 | 18 | |
| 13 | | | 19 | 20 | 21 | 22 | 8 | 7 | 6 | 5 | 4 | 3 | 2 | 1 | 0 | 18 | 17 | |
| 9 | | | 20 | 21 | 22 | 23 | 8 | 7 | 6 | 5 | 4 | 3 | 2 | 1 | 0 | 23 | 22 | 16M DATA DRAM |
| 10 | | | 20 | 21 | 22 | 23 | 8 | 7 | 6 | 5 | 4 | 3 | 2 | 1 | 0 | 22 | 21 | |
| 11 | | | 20 | 21 | 22 | 23 | 8 | 7 | 6 | 5 | 4 | 3 | 2 | 1 | 0 | 21 | 20 | |
| 12 | | | 20 | 21 | 22 | 23 | 8 | 7 | 6 | 5 | 4 | 3 | 2 | 1 | 0 | 20 | 19 | |
| 13 | | | 20 | 21 | 22 | 23 | 8 | 7 | 6 | 5 | 4 | 3 | 2 | 1 | 0 | 19 | 18 | |
| 9 | | | 21 | 22 | 23 | 24 | 8 | 7 | 6 | 5 | 4 | 3 | 2 | 1 | 0 | 24 | 23 | 32M DATA DRAM |
| 10 | | | 21 | 22 | 23 | 24 | 8 | 7 | 6 | 5 | 4 | 3 | 2 | 1 | 0 | 23 | 22 | |
| 11 | | | 21 | 22 | 23 | 24 | 8 | 7 | 6 | 5 | 4 | 3 | 2 | 1 | 0 | 22 | 21 | |
| 12 | | | 21 | 22 | 23 | 24 | 8 | 7 | 6 | 5 | 4 | 3 | 2 | 1 | 0 | 21 | 20 | |
| 13 | | | 21 | 22 | 23 | 24 | 8 | 7 | 6 | 5 | 4 | 3 | 2 | 1 | 0 | 20 | 19 | |
| 9 | | 22 | 23 | 24 | 25 | 8 | 7 | 6 | 5 | 4 | 3 | 2 | 1 | 0 | 25 | 24 | 64M DATA DRAM |
| 10 | | 22 | 23 | 24 | 25 | 8 | 7 | 6 | 5 | 4 | 3 | 2 | 1 | 0 | 24 | 23 | |
| 11 | | 22 | 23 | 24 | 25 | 8 | 7 | 6 | 5 | 4 | 3 | 2 | 1 | 0 | 23 | 22 | |
| 12 | | 22 | 23 | 24 | 25 | 8 | 7 | 6 | 5 | 4 | 3 | 2 | 1 | 0 | 22 | 21 | |
| 13 | | 22 | 23 | 24 | 25 | 8 | 7 | 6 | 5 | 4 | 3 | 2 | 1 | 0 | 21 | 20 | |

TABLE 5

*Figure 12*

MAXIMUM CONFIGURABLE DATA SEGMENTS = 2                                               1310

| # OF CS DRAM COLS. | COMMON DATA AND CS DRAM COLUMN ADDRESS | | | | | | | | | | | DATA DRAM COL ADDRESS | | CS DRAM COL ADDRESS | | |
|---|---|---|---|---|---|---|---|---|---|---|---|---|---|---|---|---|
| | 12 | 11 | 10 | 9 | 8 | 7 | 6 | 5 | 4 | 3 | 2 | 1 | 0 | 1 | 0 | |
| 9  | | 16 | 17 | 18 | 19 | 8 | 7 | 6 | 5 | 4 | 3 | 2 | 1 | 0 | 19 | S0 | 1M DATA DRAM |
| 10 | | 16 | 17 | 18 | 19 | 8 | 7 | 6 | 5 | 4 | 3 | 2 | 1 | 0 | 18 | S0 | |
| 11 | | 16 | 17 | 18 | 19 | 8 | 7 | 6 | 5 | 4 | 3 | 2 | 1 | 0 | 17 | S0 | |
| 12 | | 16 | 17 | 18 | 19 | 8 | 7 | 6 | 5 | 4 | 3 | 2 | 1 | 0 | 16 | S0 | |
| 13 | | 16 | 17 | 18 | 19 | 8 | 7 | 6 | 5 | 4 | 3 | 2 | 1 | 0 | 15 | S0 | |
| 9  | 17 | 18 | 19 | 20 | 8 | 7 | 6 | 5 | 4 | 3 | 2 | 1 | 0 | 20 | S0 | 2M DATA DRAM |
| 10 | 17 | 18 | 19 | 20 | 8 | 7 | 6 | 5 | 4 | 3 | 2 | 1 | 0 | 19 | S0 | |
| 11 | 17 | 18 | 19 | 20 | 8 | 7 | 6 | 5 | 4 | 3 | 2 | 1 | 0 | 18 | S0 | |
| 12 | 17 | 18 | 19 | 20 | 8 | 7 | 6 | 5 | 4 | 3 | 2 | 1 | 0 | 17 | S0 | |
| 13 | 17 | 18 | 19 | 20 | 8 | 7 | 6 | 5 | 4 | 3 | 2 | 1 | 0 | 16 | S0 | |
| 9  | 18 | 19 | 20 | 21 | 8 | 7 | 6 | 5 | 4 | 3 | 2 | 1 | 0 | 21 | S0 | 4M DATA DRAM |
| 10 | 18 | 19 | 20 | 21 | 8 | 7 | 6 | 5 | 4 | 3 | 2 | 1 | 0 | 20 | S0 | |
| 11 | 18 | 19 | 20 | 21 | 8 | 7 | 6 | 5 | 4 | 3 | 2 | 1 | 0 | 19 | S0 | |
| 12 | 18 | 19 | 20 | 21 | 8 | 7 | 6 | 5 | 4 | 3 | 2 | 1 | 0 | 18 | S0 | |
| 13 | 18 | 19 | 20 | 21 | 8 | 7 | 6 | 5 | 4 | 3 | 2 | 1 | 0 | 17 | S0 | |
| 9  | 19 | 20 | 21 | 22 | 8 | 7 | 6 | 5 | 4 | 3 | 2 | 1 | 0 | 22 | S0 | 8M DATA DRAM |
| 10 | 19 | 20 | 21 | 22 | 8 | 7 | 6 | 5 | 4 | 3 | 2 | 1 | 0 | 21 | S0 | |
| 11 | 19 | 20 | 21 | 22 | 8 | 7 | 6 | 5 | 4 | 3 | 2 | 1 | 0 | 20 | S0 | |
| 12 | 19 | 20 | 21 | 22 | 8 | 7 | 6 | 5 | 4 | 3 | 2 | 1 | 0 | 19 | S0 | |
| 13 | 19 | 20 | 21 | 22 | 8 | 7 | 6 | 5 | 4 | 3 | 2 | 1 | 0 | 18 | S0 | |
| 9  | 20 | 21 | 22 | 23 | 8 | 7 | 6 | 5 | 4 | 3 | 2 | 1 | 0 | 23 | S0 | 16M DATA DRAM |
| 10 | 20 | 21 | 22 | 23 | 8 | 7 | 6 | 5 | 4 | 3 | 2 | 1 | 0 | 22 | S0 | |
| 11 | 20 | 21 | 22 | 23 | 8 | 7 | 6 | 5 | 4 | 3 | 2 | 1 | 0 | 21 | S0 | |
| 12 | 20 | 21 | 22 | 23 | 8 | 7 | 6 | 5 | 4 | 3 | 2 | 1 | 0 | 20 | S0 | |
| 13 | 20 | 21 | 22 | 23 | 8 | 7 | 6 | 5 | 4 | 3 | 2 | 1 | 0 | 19 | S0 | |
| 9  | 21 | 22 | 23 | 24 | 8 | 7 | 6 | 5 | 4 | 3 | 2 | 1 | 0 | 24 | S0 | 32M DATA DRAM |
| 10 | 21 | 22 | 23 | 24 | 8 | 7 | 6 | 5 | 4 | 3 | 2 | 1 | 0 | 23 | S0 | |
| 11 | 21 | 22 | 23 | 24 | 8 | 7 | 6 | 5 | 4 | 3 | 2 | 1 | 0 | 22 | S0 | |
| 12 | 21 | 22 | 23 | 24 | 8 | 7 | 6 | 5 | 4 | 3 | 2 | 1 | 0 | 21 | S0 | |
| 13 | 21 | 22 | 23 | 24 | 8 | 7 | 6 | 5 | 4 | 3 | 2 | 1 | 0 | 20 | S0 | |
| 9  | 22 | 23 | 24 | 25 | 8 | 7 | 6 | 5 | 4 | 3 | 2 | 1 | 0 | 25 | S0 | 64M DATA DRAM |
| 10 | 22 | 23 | 24 | 25 | 8 | 7 | 6 | 5 | 4 | 3 | 2 | 1 | 0 | 24 | S0 | |
| 11 | 22 | 23 | 24 | 25 | 8 | 7 | 6 | 5 | 4 | 3 | 2 | 1 | 0 | 23 | S0 | |
| 12 | 22 | 23 | 24 | 25 | 8 | 7 | 6 | 5 | 4 | 3 | 2 | 1 | 0 | 22 | S0 | |
| 13 | 22 | 23 | 24 | 25 | 8 | 7 | 6 | 5 | 4 | 3 | 2 | 1 | 0 | 21 | S0 | |

TABLE 6

S0 = 0 WHEN SEGMENT 0 IS ADDRESSED
S0 = 1 WHEN SEGMENT 1 IS ADDRESSED

*Figure 13*

MAXIMUM CONFIGURABLE DATA SEGMENTS = 4

| # OF CS DRAM COLS. | COMMON DATA AND CS DRAM COLUMN ADDRESS | | | | | | | | | | DATA DRAM COL ADDRESS | | CS DRAM COL ADDRESS | | |
|---|---|---|---|---|---|---|---|---|---|---|---|---|---|---|---|
| | 12 | 11 | 10 | 9 | 8 | 7 | 6 | 5 | 4 | 3 | 2 | 1 | 0 | 1 | 0 | |
| 9  | | 16 | 17 | 18 | 19 | 8 | 7 | 6 | 5 | 4 | 3 | 2 | 1 | 0 | S1 S0 | 1M DATA DRAM |
| 10 | | 16 | 17 | 18 | 19 | 8 | 7 | 6 | 5 | 4 | 3 | 2 | 1 | 0 | S1 S0 | |
| 11 | | 16 | 17 | 18 | 19 | 8 | 7 | 6 | 5 | 4 | 3 | 2 | 1 | 0 | S1 S0 | |
| 12 | | 16 | 17 | 18 | 19 | 8 | 7 | 6 | 5 | 4 | 3 | 2 | 1 | 0 | S1 S0 | |
| 13 | | 16 | 17 | 18 | 19 | 8 | 7 | 6 | 5 | 4 | 3 | 2 | 1 | 0 | S1 S0 | |
| 9  | | 17 | 18 | 19 | 20 | 8 | 7 | 6 | 5 | 4 | 3 | 2 | 1 | 0 | S1 S0 | 2M DATA DRAM |
| 10 | | 17 | 18 | 19 | 20 | 8 | 7 | 6 | 5 | 4 | 3 | 2 | 1 | 0 | S1 S0 | |
| 11 | | 17 | 18 | 19 | 20 | 8 | 7 | 6 | 5 | 4 | 3 | 2 | 1 | 0 | S1 S0 | |
| 12 | | 17 | 18 | 19 | 20 | 8 | 7 | 6 | 5 | 4 | 3 | 2 | 1 | 0 | S1 S0 | |
| 13 | | 17 | 18 | 19 | 20 | 8 | 7 | 6 | 5 | 4 | 3 | 2 | 1 | 0 | S1 S0 | |
| 9  | | 18 | 19 | 20 | 21 | 8 | 7 | 6 | 5 | 4 | 3 | 2 | 1 | 0 | S1 S0 | 4M DATA DRAM |
| 10 | | 18 | 19 | 20 | 21 | 8 | 7 | 6 | 5 | 4 | 3 | 2 | 1 | 0 | S1 S0 | |
| 11 | | 18 | 19 | 20 | 21 | 8 | 7 | 6 | 5 | 4 | 3 | 2 | 1 | 0 | S1 S0 | |
| 12 | | 18 | 19 | 20 | 21 | 8 | 7 | 6 | 5 | 4 | 3 | 2 | 1 | 0 | S1 S0 | |
| 13 | | 18 | 19 | 20 | 21 | 8 | 7 | 6 | 5 | 4 | 3 | 2 | 1 | 0 | S1 S0 | |
| 9  | | 19 | 20 | 21 | 22 | 8 | 7 | 6 | 5 | 4 | 3 | 2 | 1 | 0 | S1 S0 | 8M DATA DRAM |
| 10 | | 19 | 20 | 21 | 22 | 8 | 7 | 6 | 5 | 4 | 3 | 2 | 1 | 0 | S1 S0 | |
| 11 | | 19 | 20 | 21 | 22 | 8 | 7 | 6 | 5 | 4 | 3 | 2 | 1 | 0 | S1 S0 | |
| 12 | | 19 | 20 | 21 | 22 | 8 | 7 | 6 | 5 | 4 | 3 | 2 | 1 | 0 | S1 S0 | |
| 13 | | 19 | 20 | 21 | 22 | 8 | 7 | 6 | 5 | 4 | 3 | 2 | 1 | 0 | S1 S0 | |
| 9  | 20 | 21 | 22 | 23 | | 8 | 7 | 6 | 5 | 4 | 3 | 2 | 1 | 0 | S1 S0 | 16M DATA DRAM |
| 10 | 20 | 21 | 22 | 23 | | 8 | 7 | 6 | 5 | 4 | 3 | 2 | 1 | 0 | S1 S0 | |
| 11 | 20 | 21 | 22 | 23 | | 8 | 7 | 6 | 5 | 4 | 3 | 2 | 1 | 0 | S1 S0 | |
| 12 | 20 | 21 | 22 | 23 | | 8 | 7 | 6 | 5 | 4 | 3 | 2 | 1 | 0 | S1 S0 | |
| 13 | 20 | 21 | 22 | 23 | | 8 | 7 | 6 | 5 | 4 | 3 | 2 | 1 | 0 | S1 S0 | |
| 9  | 21 | 22 | 23 | 24 | | 8 | 7 | 6 | 5 | 4 | 3 | 2 | 1 | 0 | S1 S0 | 32M DATA DRAM |
| 10 | 21 | 22 | 23 | 24 | | 8 | 7 | 6 | 5 | 4 | 3 | 2 | 1 | 0 | S1 S0 | |
| 11 | 21 | 22 | 23 | 24 | | 8 | 7 | 6 | 5 | 4 | 3 | 2 | 1 | 0 | S1 S0 | |
| 12 | 21 | 22 | 23 | 24 | | 8 | 7 | 6 | 5 | 4 | 3 | 2 | 1 | 0 | S1 S0 | |
| 13 | 21 | 22 | 23 | 24 | | 8 | 7 | 6 | 5 | 4 | 3 | 2 | 1 | 0 | S1 S0 | |
| 9  | 22 | 23 | 24 | 25 | | 8 | 7 | 6 | 5 | 4 | 3 | 2 | 1 | 0 | S1 S0 | 64M DATA DRAM |
| 10 | 22 | 23 | 24 | 25 | | 8 | 7 | 6 | 5 | 4 | 3 | 2 | 1 | 0 | S1 S0 | |
| 11 | 22 | 23 | 24 | 25 | | 8 | 7 | 6 | 5 | 4 | 3 | 2 | 1 | 0 | S1 S0 | |
| 12 | 22 | 23 | 24 | 25 | | 8 | 7 | 6 | 5 | 4 | 3 | 2 | 1 | 0 | S1 S0 | |
| 13 | 22 | 23 | 24 | 25 | | 8 | 7 | 6 | 5 | 4 | 3 | 2 | 1 | 0 | S1 S0 | |

TABLE 7

S1-S0 = 00 WHEN SEGMENT 0 IS ADDRESSED
S1-S0 = 01 WHEN SEGMENT 1 IS ADDRESSED
S1-S0 = 10 WHEN SEGMENT 2 IS ADDRESSED
S1-S0 = 11 WHEN SEGMENT 3 IS ADDRESSED

*Figure 14*

MAPPING SHARED DRAM ADDRESS BITS BY ACCESSING DATA MEMORY IN PAGE MODE CACHE STATUS MEMORY IN WORD MODE

CROSS-REFERENCE TO RELATED APPLICATIONS

This patent application is related to the following commonly owned, concurrently filed, co-pending U.S. utility patent application:

"Synchronized Four-Word Data DRAM," Ser. No. 08/862,880, by Philip Bolyn, incorporated herein by reference.

BACKGROUND OF THE INVENTION

1. Field of the Invention The present invention relates generally to memory systems and, more particularly, to reconfigurable memory systems including a variably sized page-accessed data memory portion and a variably sized, simultaneously accessible, word-accessed, cache status memory portion.

2. Related Art

In complex computing environments, difficult computing tasks may be divided into sub-tasks for parallel processing by multiple processors. Typically, at least one processor is designated as a scheduling processor for scheduling tasks to be performed by the other processors.

In a multi-processing system, individual processors may be provided with local memory for storing necessary data and applications software for processing assigned tasks. Often, one processor has access to data and applications software for performing one or more specific type or group of specific types of tasks while other processors have access to different data and software applications programs for performing other types of tasks. This type of system permits specialization of processors and division of labor according to the type of task to be performed.

One drawback of a specialized multi processing system is that where a series of similar tasks must be performed, one or more processors may lack the necessary data or software for processing those tasks. As a result, one or more processors may sit idle while others struggle to process the tasks alone.

In more advanced multi-processing systems, a shared memory is provided for storing necessary data and software for performing one or more anticipated tasks. A shared memory is accessible by most, if not all, processors or requesters within the system so that each processor is capable of performing any assigned task. A central controller or scheduler divides the tasks equally among all processors, thus insuring that the tasks are completed as quickly as possible.

In a shared memory system, however, conflicts may arise if different processors or requestors attempt to access the same location of shared memory. A shared memory system must, therefore, include a conflict resolution method for determining which requestor should be granted access. A conflict resolution device may at times, have to provide a particular requestor with sole access to the requested memory location. Sole access may be required where a processor is assigned a task which requires repeated access to specified data or applications software, especially where the requester may change the value stored in the shared memory.

A typical method of restricting access to specified memory locations is to assign ownership of individual memory locations to particular requestors. A simple ownership scheme may provide only one level of ownership. In such a system, if a requestor has ownership over a particular memory location, it has full authority to access, i.e., read from or write to, that location and no other processor is permitted access to that location. More complicated ownership schemes may provide multiple levels of ownership, each higher level providing a higher degree of control. Multiple levels of ownership may be based on priority levels assigned to individual requestors or other factors.

Regardless of the specific type of ownership protocol employed, a shared memory system must provide for storing and updating ownership data.

Typically, ownership data is stored in a reserved portion of the memory which it tracks. The ownership-storing portion of memory is often referred to as cache-status memory or status memory while the tracked-memory is typically referred to as data memory. Because each successive group of data memory words comprising a cache page, typically four words, requires an associated status data location for storing status data associated with the cache page data, a substantial portion of memory must be reserved for status data.

A second problem encountered in shared memory systems concerns reading and updating cache status memory. Typically, when a memory controller accesses data memory, it must also read the associated cache status memory. This is to insure that ownership rules are not violated and to determine whether ownership status must be updated for that location. If ownership data requires updating, then the memory controller must also write to the cache status memory.

One method of maintaining ownership in a shared memory system is to employ a Read-Modify-Write sequence concurrently for data and status. With this method, every memory access includes reading a data location and an associated cache location, modifying the cache status, and then writing the modified cache status back to the cache status memory, and writing the data back to the data memory. Thus, when data must be written, a data read is unnecessarily performed when status is read. Similarly, when data must be read, an unnecessary data write is performed when status is written.

Yet a further drawback to typical shared memory systems is their inability to accommodate multiple or various memory configurations. Multi-processor systems are employed for a variety of different types of tasks, some of which are unforeseen at the time of manufacture. Some tasks may be memory intensive, requiring vast amounts of memory for storing data or applications, while other tasks may be speed or space sensitive, where only minimal memory capacity is desired. Typical multi-processor systems, however, incorporate fixed designs with little ability for memory reconfiguration.

This is due, in part, to memory controllers which generate addressing, timing and control signals for the data and cache status memories. These memory controllers are typically designed for specific memory devices having a specified memory size and addressing scheme. Once a memory controller is chosen for incorporation into a memory system, the memory system is limited to employing only memory devices which are compatible with the provided memory controller.

A shared memory system, therefore, generally requires substantial cache memory space for storing the status of associated data, performs unnecessary data read and write cycles and does not sufficiently provide for memory reconfiguration capabilities. These drawbacks may, in some circumstances, outweigh the advantages of sharing memory.

What is needed, therefore, is a reconfigurable memory system including a page accessed data memory portion and a word accessed cache status memory portion which are simultaneously but independently accessed.

SUMMARY OF THE INVENTION

The present invention is directed toward a reconfigurable memory system including a data memory and an associated but distinct, simultaneously and independently accessible cache status memory.

One advantage of the present invention is that a data memory and an associated status memory can be accessed simultaneously yet independently, thus permitting different operations to be performed simultaneously on each memory.

Another advantage of the present invention is that a variety of data memory and cache status memory configurations can be accommodated by employing programmable control logic.

In a preferred embodiment, a memory system includes a data memory portion and a status memory portion. The status memory portion is distinct from the data memory portion so that both are independently and simultaneously accessible.

In the preferred embodiment, a programmable memory controller accesses data memory a page at a time. The associated status memory, therefore, need only store one word of status information for a page of data memory. In the preferred embodiment, the size of a page is four words so that one word of status memory stores status information for four words of data memory.

In the preferred embodiment, the memory system includes multiple banks of memory, each bank of memory including data memory and an associated cache status memory. Data memory within each bank of memory includes one or more individual data memory modules associated with a single cache status memory module. Each data memory module and cache status memory module may include any of a variety of integrated memory circuit configurations.

In an alternative embodiment, each bank of memory is further divided into at least a pair of memory segments, each segment including a number of individual data memory modules associated with a single status memory module.

In the preferred embodiment, each bank of memory receives an independent set of control signals for accessing the data memory and the status memory contained therein, generated by an ASIC memory controller. The control signals include timing and control signals and memory address signals. Memory address signals include a first set of address signals for addressing data memory and a second set of address signals for addressing cache status memory.

In the preferred embodiment, the second set of address signals comprises a portion of the first set of address signals and a set of supplemental address signals generated by programmable control logic. Programmable control logic generates these supplemental cache status address signals for any of a number of configurations of the preferred embodiment of memory.

Programmable control logic accommodates various memory configurations based on the maximum number of data memory modules employed by a bank, the size of an addressed data memory module in that bank and the number of addressable cache status columns. Programmable control logic generates the supplemental address lines for the cache status memory which, in combination with a portion of the first set of address signals, accesses cache status memory in a word mode, each of which is associated with a page of data memory.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit of a reference number identifies the drawing in which the reference number first appears.

FIG. 7 is a schematic diagram of an ASIC controlled memory system having two modules of data memory per bank of memory, in accordance with the present invention.

FIG. 11 provides logic tables corresponding to logic elements shown in the logic diagram of FIG. 10.

FIG. 12 provides address tables for the present invention for the case where the maximum number of data modules is 1.

FIG. 13 provides an address table for the present invention for the case where the maximum number of data modules is 2.

FIG. 14 provides an address table for the present invention for the case where the maximum number of data modules is 4.

DETAILED DESCRIPTION OF THE PREFERRED EMBODIMENTS

I. Overview

One aspect of the present invention is directed toward a reconfigurable memory system including a data memory and an associated but distinct, simultaneously accessible cache status memory. In the preferred embodiment, the memory system includes at least one memory bank, each bank including at least one data memory module and one simultaneously accessible cache status memory module. Where there is more than one data memory module, each module may be populated with DRAM ICs having a different memory capacity than any other module.

Another aspect of the present invention is directed toward programmable control logic which receives memory configuration information and generates supplemental address signals for accessing the cache status memory portion, concurrently with data memory accessing. In a preferred embodiment, the programmable control logic is implemented with an application-specific integrated circuit (ASIC) which also serves as the memory controller for the memory system. In the preferred embodiment, the ASIC memory controller addresses the data memory in a four-word-per-page mode, so that the associated cache status memory stores one word of status data for each four words of data memory.

Although the examples provided herein describe the preferred embodiment of the present invention as employing an ASIC memory controller and DRAM data and cache status based memory, the present invention can be implemented with many other types of memory devices and memory controllers.

Possible memory types include, without limitation, static random access memory (SRAM), video memory (VRAM), three-dimensional random access memory (3DDRAM), synchronous dynamic random access memory (SDRAM), windows random access memory (WRAM), cache DRAM, multi-bank DRAM, and other memory devices not yet conceived.

II. A Reconfigurable Memory System Including a Data Memory Portion and an Associated But Distinct, Concurrently Accessible, Reduced Size, Cache Status Memory.

Figure 1:
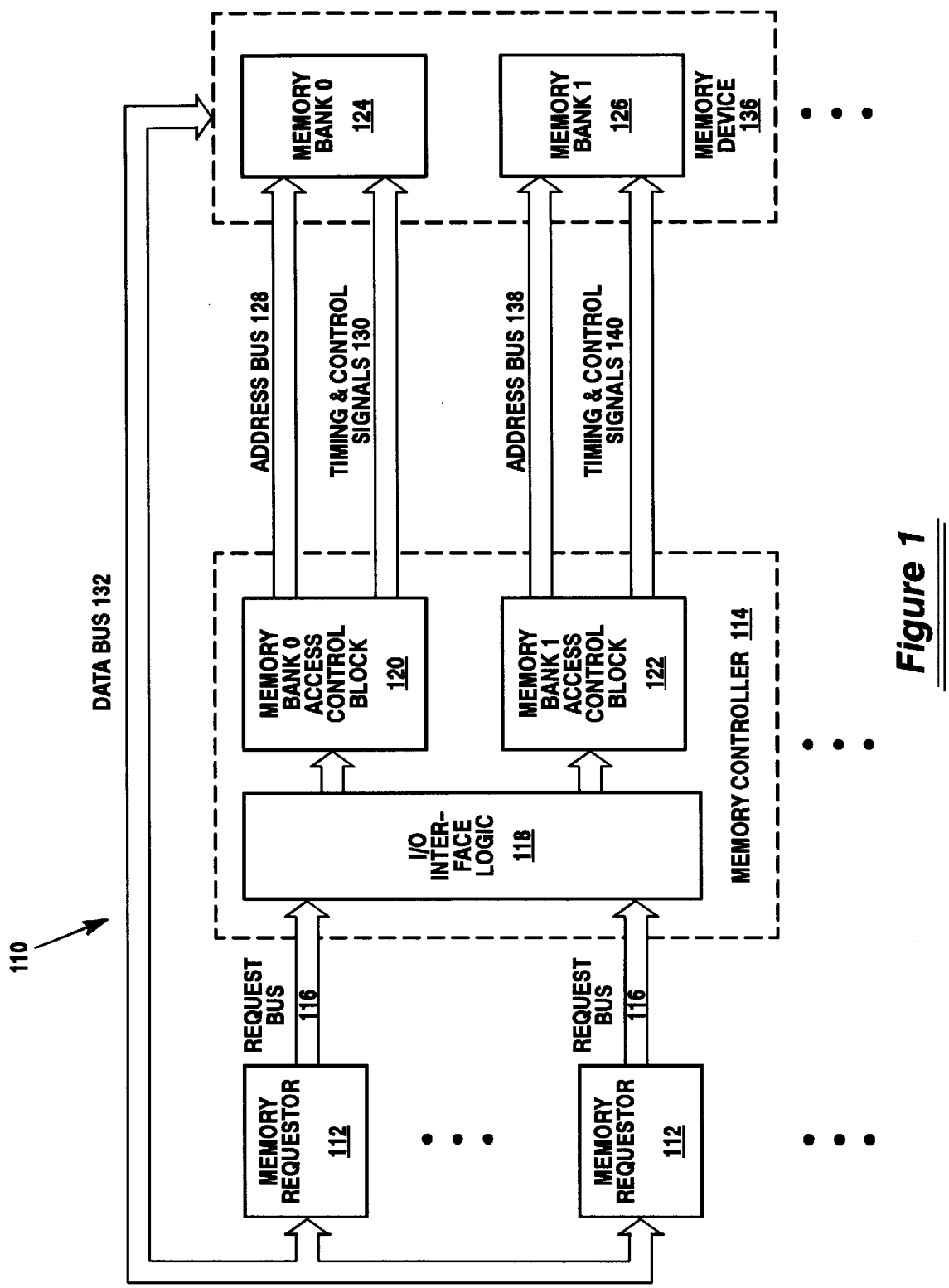
FIG. 1 is a high-level block diagram of a multiple memory bank memory system.

Referring to FIG. 1, a high-level block diagram of a typical memory system 110 is shown. System 110 includes a plurality of memory requesters 112, and at least one memory controller 114 for controlling a memory device 136. Additional memory devices (not shown) may be controlled by additional memory controllers (not shown).

Memory requesters 112 may be individual processors or memory request routers. Memory request routers are devices, possibly ASIC devices, which route memory requests from a number of requesting processors to any of a number of memory controllers.

Memory controller 114 includes I/O interface logic 118 for receiving memory requests from requestors 112. I/O interface logic 118 transfers memory requests to memory access control blocks 120 and 122 which generate necessary timing, control and address signals for controlling access to memory device 136. Specifically, control block 120 generates a first set of address signals for output on address bus 128 and a first set of timing and control signals for output on timing and control bus 130. Control block 122 generates a second set of address signals for output on address bus 138 and a second set of timing and control signals for output on timing and control bus 140.

Memory device 136 includes two banks of memory, 124 and 126. Bank 124 receives address signals on bus 128 and timing and control signal on bus 130. Similarly, bank 126 receives address signals on bus 138 and timing and control signals on bus 140.

Data bus 132 carries data between requesters 112 and memory device 136. Data bus 132 may be a single bus for coupling all banks of memory and all requesters 112 or data bus 132 may include a number of individual data buses, each bus carrying data between a single requestor and a single bank of memory. There are, of course, may other possible data bus configurations for carrying data between memory device 136 and requestors 112.

Figure 2:
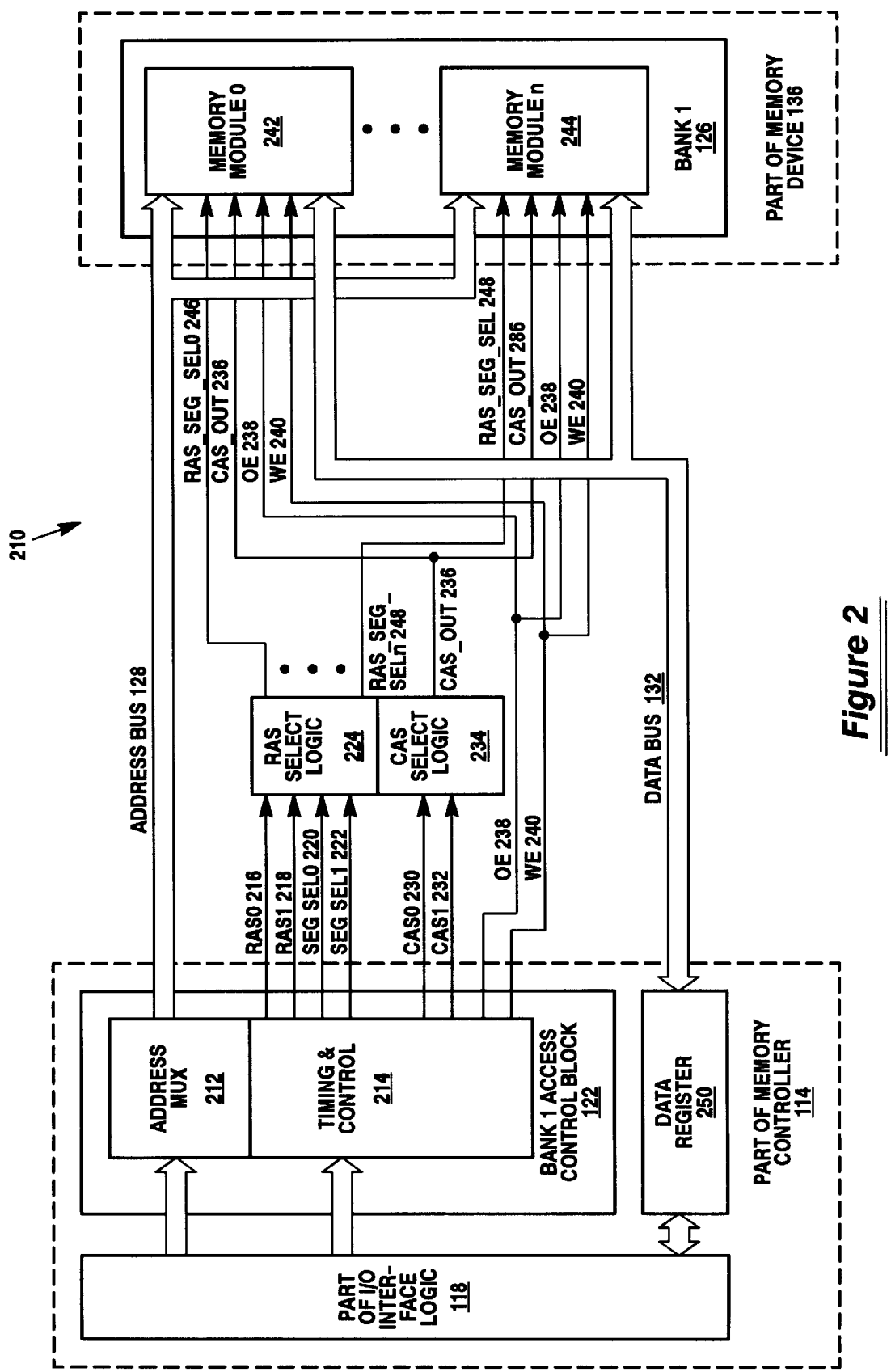
FIG. 2 is a detailed block diagram of a portion of a multiple bank memory system.

Referring to FIG. 2, a detailed block diagram of a portion 210 of memory system 110 of FIG. 1 is shown. FIG. 2 shows bank 1 access control block 122 and data memory bank 126 in greater detail, along with the signals supplies by block 122 to memory bank 126.

Bank 1 control block 122 includes address multiplexer 212 for generating address signals for output on address bus 128. Where memory device 136 employs row and column addressable DRAM memory devices, address multiplexer 212 outputs a row address followed by a column address.

Bank 1 control block 122 also includes timing and control module 214 for generating necessary timing and control signals for accessing data memory bank 216. These timing and control signals include row and column address strobe signals for indicating when a valid row or column address is present on an associated address bus and read and write enable signals.

Row address strobe signals include RAS0 216, RAS1 218, SEG_SEL_0 220, and SEG_SEL_1 signal 222. These four row address signals are input to RAS select logic 224, which outputs up to n RAS_SEG_SEL signals 246–248.

Timing and control unit 214 generates column address strobe signals CAS0 230 and CAS1 232. CAS signals 230 and 232 are received by CAS select logic 234, which outputs CAS_OUT signal 236. Although input signals 230 and 232 could be used to produce as many as four column address signals, only one is needed, as described below.

Timing and control unit 214 generates output enable signal OE 238 and write enable signal WE 240 for controlling reading and writing operations of memory device 136.

Memory bank 126 includes up to n memory modules 242 through 244. Each memory module 242–244 is coupled to common address bus 128, common CAS 236, OE 238 and WE 240. Each memory module 242–244, however, receives a unique RAS_SEG_SEL signal from RAS select logic 224. Memory module 242, for instance, is shown receiving RAS_SEG_SEL0 246 while memory module 244 is shown receiving RAS_SEG_SELn 248.

Memory modules 242–244 each include one or more memory devices, typically integrated circuits (not shown). These memory devices may be row and column addressable devices such as a typical DRAM device. Row and column addressable devices permit smaller address busses because, typically, a first half of the requested address is sent as a row address after which a second half of the address is sent as a column address. Here for example, address mux 212 and timing and control unit 214 may cooperate to multiplex a row address onto bus 128 followed by a column address.

In operation, when memory controller 114 receives a read request for a memory address in bank 126, memory controller 114 accesses bank 128 as follows. First, address mux 212 outputs the requested address row on address bus 128. At substantially the same time, if the requested address is within memory module 242, timing and control unit 214 generates the necessary combination of row address strobe and segment select signals, 216, 218, 220 and 222 to enable RAS select logic 224 to output RAS_SEG_SEL_0 signal 246 which latches the row address from bus 128 into module 242.

Thereafter, address mux 212 outputs the requested column address on address bus 128. At substantially the same time, timing and control unit 214 generates the necessary combination of column address strobe signals, 230 and 232 to enable CAS select logic 224 to output CAS_OUT signal 236 which latches the column address from bus 128 into module 242.

At substantially the same time that column address data is latched into memory module 242, timing and control unit 214 outputs output enable OE 236 to cause memory module 244 to read out the contents of the requested memory location onto data bus 132. Alternatively, timing and control unit 214 could output a write enable WE 240 to write data from bus 132 into the requested memory location.

Note that data bus 132 is shown coupled between data register 250 and individual memory modules 242–244. This is another way of providing a data path between requesters 112 and memory device 136. Note that, although memory module 244 receives the same CAS_OUT 236 and OE 238 or WE 240 signals are received by memory module 242, module 244 can not read or write to bus 132 because it did not receive row address strobe RAS_SEG_SELn signal 246. Thus, although CAS logic select 234 could easily be modified to provide separate column address select signals to each of modules 242 through 244, it is not necessary as long as there is an individual row address select signal for each module.

Where multiple requesters 112 in FIG. 1 attempt to access the same memory location, some method of dispute arbitration is required. These disputes are typically arbitrated with an ownership scheme whereby the ability of a requestor 112 to access a particular memory location depends on the level of ownership which that processor possesses regarding the desired memory location.

Often, conflicting requests are resolved by a central scheduling processor (not shown).

Regardless of where or how resolution is resolved, ownership data must be maintained in a memory. In system 210, ownership data is typically stored within the memory module to which it pertains. Data bus 132 and data register 250 also provide a cache status data path for reading from and writing to the cache status portion of memory modules 242–244. However, a cache status memory word must be reserved for each addressable memory word.

Figure 3B:
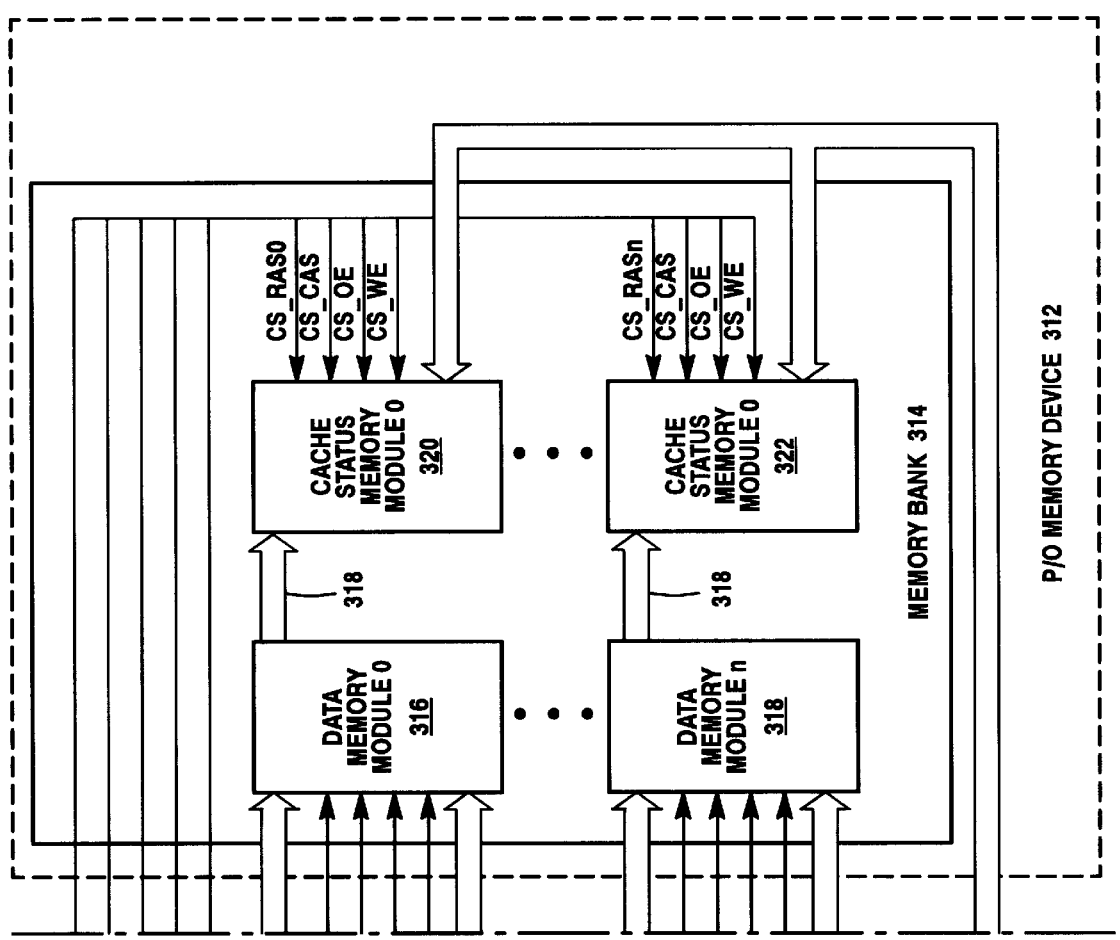
FIG. 3 is a detailed block diagram of a shared memory system having a separate status memory module for each data memory module.

Referring to FIG. 3, memory system 310 provides a data memory which is concurrently accessible with a cache status memory. Memory system 310 includes memory controller 311 for controlling a memory device 312. Memory device 312 includes at least one memory bank 314. Memory bank 314 includes n data memory modules 316–318 and a distinct cache status memory module 320–322 for each memory module 316–318. Because memory modules 316–318 are distinct from cache status memory modules 316–318, data memory modules 320–222 are accessible concurrently with cache status memory modules. As a result, while status is read, modified and written, data is either written or read. Thus, bandwidth almost doubles because memory busy time is almost halved. Moreover, because no portion of memory modules 316–318 need to be reserved for storing status data, memory modules 316–318 are free to store data and applications only.

Memory controller 311 includes an address mux 326, analogous to address mux 212 of system 110, for multiplexing row and column address signals onto address bus 319.

Memory controller 311 also includes a timing and control unit 328, analogous to timing and control unit 214 of memory controller 114, for generating RAS0 340, RAS1 342, SEG_SEL_0 344, SEG_SEL_1 346, CAS0 348, CAS1 350, OE 352 and WE 354. Address mux 326 and timing and control generator 328 of memory controller 311 controls data memory modules 316–318 in substantially the same manner that controller 114 controls memory modules 242–244 in FIG. 2.

Cache status memory modules 320–322 receive the same address signals from address bus 319 which are received by data memory modules 316–318. Essentially, each addressable location of data memory has an associated cache status memory location for storing ownership data relating to the data memory location.

The primary difference between memory controllers 114 and 311 is the addition of cache status memory timing and control unit 324. Unit 324 generates timing and control signals necessary for accessing cache status memory modules 320–322, including CS_RAS0 332 through CS_RASn 333, CS_CAS 334, CS_OE 336 and CS_WE 338. Unit 324 does not, however, generate an address signal for cache status memory modules 320–322. Instead, cache status memory modules 320–322 and data memory modules 316–318 employ the same address bus 319.

In operation, upon receipt of a memory access request, address mux 326 outputs a row address on bus 319. Soon thereafter, timing and control 328 generates the necessary row address strobe signals 340, 342, 344 and 346 for outputting a RAS_SEG_SEL0 358 from RAS select logic 374. RAS_SEG_SEL0 358 latches the row address from bus 319 into data memory module 316.

Concurrently, cache status timing and control 324 generates row address strobe CS_RAS_0 332 which latches the row address from bus 319 into cache status memory module 320.

Address mux 326 then outputs a column address on bus 319 which is latched into data memory module 316 and cache status memory module 320 by CAS_OUT 362 and CS_CAS 334, respectively.

With the same row and column addresses latched into data memory module 316 and cache status memory module 320, timing and control 328 generates output enable OE 352 or write enable WE 354 for reading from or writing to the addressed location of data memory module 316. Concurrently, cache status timing and control generates output enable CS_OE 336 or write enable CS_WE 338 for reading from or writing to the addressed location of cache status memory module 320.

Note that a separate cache status data bus 366 is provided, along with a cache status data register 372, for transferring cache status data between memory controller 311 and cache status memory modules 320–322.

System 310, therefore, accesses data memory and cache status memory simultaneously yet independently, without significantly increasing the required number of address and control signals.

Figure 4A:
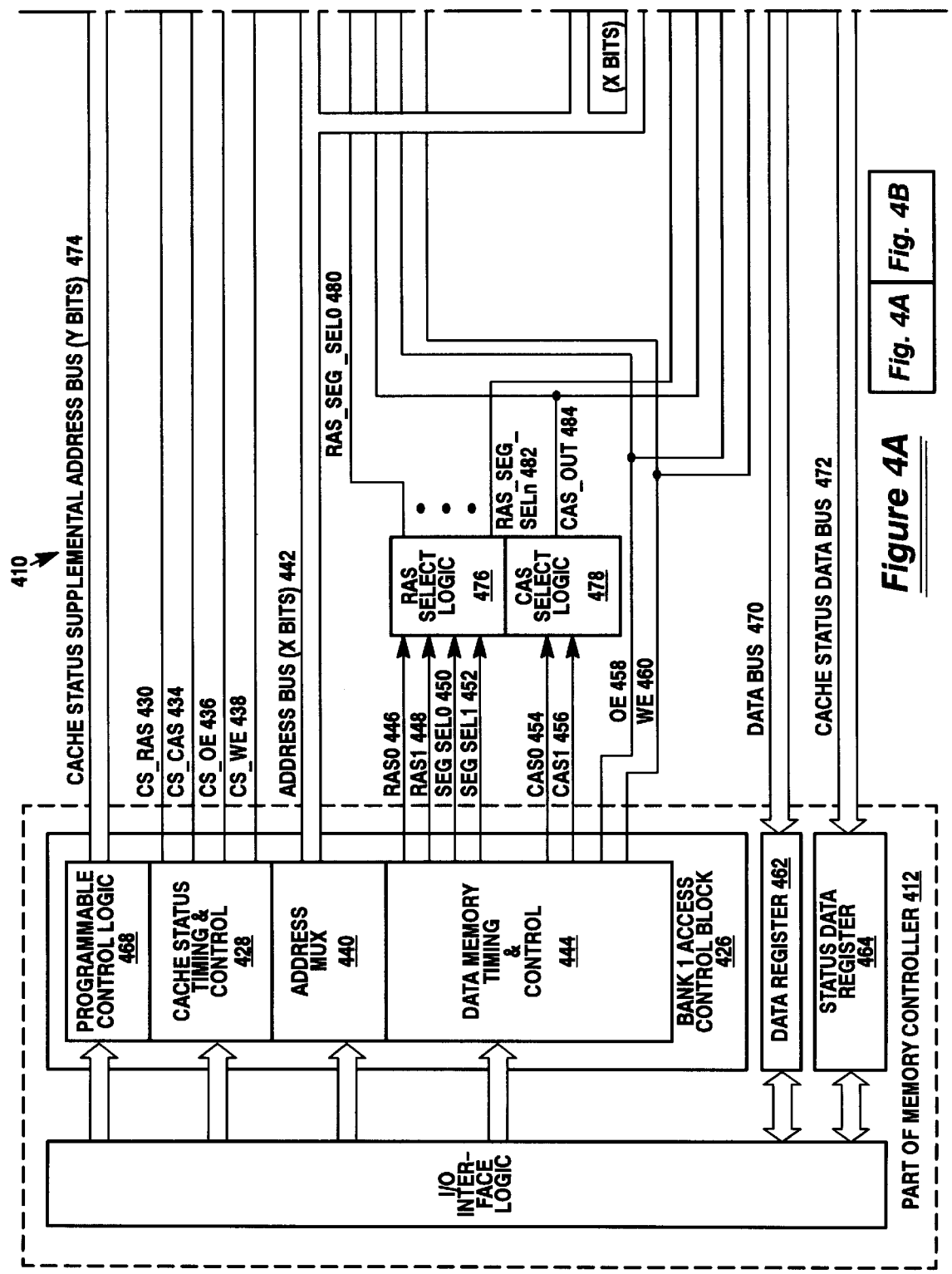
FIG. 4 is a detailed block diagram of a reconfigurable memory system having a data memory and an associated, reduced size, simultaneously accessible cache status memory, in accordance with the present invention.

Referring to FIG. 4, a memory system 410 includes only one cache status memory module 422 for storing cache status information for all of data memory modules 418–420. This is possible because memory controller 412 accesses data memory modules 418–420 in a page mode while concurrently accessing cache status memory 422 in a word mode. In a page mode, or extended data out (EDO) mode, a plurality of data memory words are sequentially accessed in a single access cycle. One word of cache status memory thus stores status for a page of data memory.

In a typical memory system employing a row/column addressing scheme, each read or write cycle requires a row address followed by a column address followed by a read or write command. If a second address is desired, a new row address, possibly identical to the prior row address, must be provided, followed by a new column address, followed by a read or write command.

In an EDO or page mode accessing scheme, however, a single row address is provided at the outset, followed by a series of column addresses. Between each column address is a read or write command for reading or writing the contents of memory associated with the initial row address and the subsequent column address. Thus, a number of read or write cycles are accomplished without supplying additional row addresses.

In the preferred embodiment, memory controller 412 accesses four words of data memory in a single access cycle. That is, a row address is followed by a first column address and a read or write command, followed by a second column address and a read or write command, followed by a third column address and a read or write command, followed by a fourth column address and a final read or write command. Four words are thus read out and three row address latch cycles are eliminated. In a four word per page mode, only one word of cache status is required for storing status data for four words of data memory.

In the preferred embodiment, memory bank 414 includes from one to four data memory modules 418–420 and one cache status memory module 422. Each data memory module 418–420 may employ any of a variety of configurations. No two data modules need to be the same. Where a bank contains more than one data memory module 418–420, one or more modules may even be left unpopulated.

A memory controller 412 is provided for controlling memory device 416. Memory controller 412 is substantially similar to memory controller 311. Access control block 426, for instance, includes cache status timing and control unit 428 for generating cache status timing and control signals CS_CAS 434, output enable CS_OE 436 and write enable CS_WE 438. Only one row address select signal, CS_RAS 430, is necessary because only one cache status module is employed.

Block 426 also includes address mux 440 for generating address data for address bus 442 and a data memory timing and control unit 444 for generating row address strobe signals RAS0 446 and RAS1 448, SEG SEL0 450 and SEG_SEL1 452, column address strobe signals CAS0 454 and CAS1 456, output enable signal OE 458 and write enable signal WE 460. Memory controller 412 also includes a data register 462 and cache status register 464, similar to those in memory controller 314.

Because data memory is accessed in page mode while cache status memory is accessed in word mode, there is no longer a one to one correspondence between data memory address locations and corresponding cache status memory address locations. As a result, an alternative addressing scheme must be provided to access status memory module 422 simultaneously with data memory modules 418–420. In a preferred embodiment, such an addressing scheme is provided by programmable control logic 468. Programmable control logic 468 generates necessary address signals regardless of the number n of data memory modules 418–420, the size of data memory modules 418–420, or the number of column address bits for cache status memory module 422. A detailed description of programmable logic 468 is provided below, in conjunction with FIGS. 9–14.

In order to conserve valuable real estate in memory system 410, cache status memory module 422 shares a substantial portion of address bus 442 with data memory modules 418–420. Address bus 442 includes x bits of address data generated by address mux 440. Status memory module 416 receives x–y bits of address signals from address bus 486. Cache status memory module 422 also receives a supplemental address bus 474, carrying y bits of supplemental cache status address signals. Between address bus 486 and address bus 474, cache status memory module 422 receives sufficient address bits to be accessed in a word mode.

Figure 5:
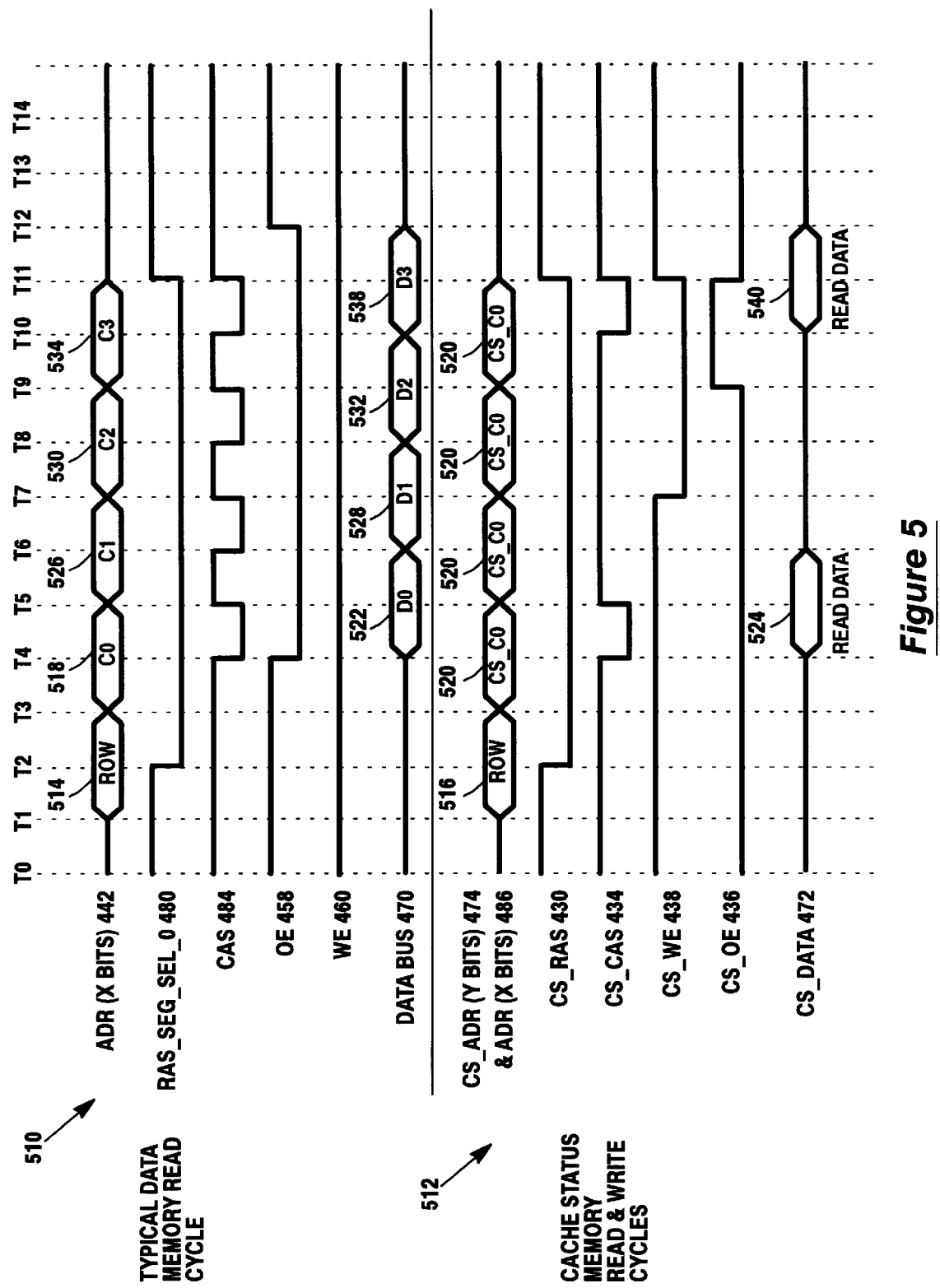
FIG. 5 is a timing diagram for the memory system of FIG. 4.

The operation of memory system 410 is best understood with reference to the timing diagram of FIG. 5. Referring to FIG. 5, a four word per page data memory read cycle is shown for system 410 along with an associated cache status read, modify and write cycle. Top portion 510 provides a data memory page mode read cycle. Bottom portion 512 provides the associated cache status memory read, modify and write cycle.

Note that during the cache status read, modify and write cycle, the data memory is read, not written to. This is a key aspect of the present invention because, by using independent control signals, unnecessary data memory accesses are avoided.

At time T1, address mux 440 outputs an X-bit row address 514 on address bus 442. Concurrently, programmable control logic 468 outputs a Y-Bit cache status supplemental row address on bus 474. Data memory module 418 receives the X-bit row address from address bus 442. Cache status memory module 422 receives both the Y-Bit address from bus 474 and the X-Y Bit address from bus 486, shown in FIG. 5 as row address packet 516.

In the preferred embodiment, cache status memory employs the Y bits as the least significant portion of the row address and the X-Y bits as the most significant portion. Also in the preferred embodiment, X equals 13 bits 12-0, and Y equal 2 so that bits 12-2 of bus 486 make up the most significant thirteen bits of the cache status row address while the two supplemental address bits from bus 474 make up the two least significant two bits, bits 1-0, of the cache status row address.

At time T2, data memory timing and control unit 444, in cooperation with RAS select logic 476, drives RAS_SEG_SEL0 480 low, which latches the row address 514 into data memory module 418. RAS 480 typically remains in an active state throughout the remainder of the access cycle.

Also at time T2, cache status timing and control unit 428 drives CS_RAS 430 low, which latches the row address packet 516 into cache status memory 422.

At time T3, address mux 440 outputs an X-bit column address 518 on bus 442. Concurrently, programmable control logic 468 outputs a Y-Bit cache status supplemental column address on bus 474. Cache status memory module 422 receives both the Y-Bit address from bus 474 and the X-Y Bit address from but 486, shown in FIG. 5 as column address packet 520.

At time T4, data memory timing and control unit 444, in cooperation with CAS select logic 478, activates CAS signal 484, which latches column address 518 into data memory module 418. Simultaneously, data memory timing and control 444 activates output enable OE 458 which reads the contents of the addressed data memory location onto data bus 470 as data packet 522.

Also at time T4, cache status timing and control unit 428 activates CS_CAS 434 which latches the column address packet 520 into cache status memory 422 and 486. Since output enable CS-OE 436 is already activated, the contents of the addressed cache status memory location is read out onto cache status data bus 472 as data packet 524. Cache status memory 422 is thus in the read portion of its read, modify and write cycle.

At time T5, address mux 440 outputs a second X-bit a column address 526 on bus 442. In the preferred embodiment, column address 526 is identical to column address 518, with the exception of the two least significant bits, which are incremented, preferably by one, over address 526. One result of this addressing scheme is that bits X-Y on bus 486 do not change. The reasons for this, and the significance, are described below in reference to FIGS. 9-14.

Also, at time T5, cache status programmable control logic 468 outputs the same Y-Bit cache status supplemental column address on bus 474 which was output at time T3. Since the X-Y bits on bus 486 are also the same, cache status memory module 422 receives the same column address packet 520 as at T3.

At time T6, data memory timing and control unit 444, in cooperation with CAS select logic 478, again activates CAS signal 484, which latches column address 526 into data memory module 418. Because OE 458 is still active, the contents of the addressed data memory location are immediately read out to data bus 470 as data packet 528. Note that the addressed location includes row address 514 which was latched into data memory module 418 at T2.

At time T7, address mux 440 outputs a third X-bit column address 530 on bus 442. In the preferred embodiment, address 530 is identical to address 526, with the exception of the two least significant bits which, in address 530, are incremented by one over address 526.

Also at time T7, as at time T5, cache status programmable control logic 468 outputs the same Y-Bit cache status supplemental column address on bus 474 that was output at times T3 and T5. Since bits X-Y on bus 486 have not changed, cache status memory 422 is presented with the same column address packet 520.

Also at time T7, cache status output enable CS_OE 436 is deactivated. Since cache status write enable CS_WE 438 is also inactive, cache status memory 422 is neither being written to nor read from. Cache status memory 422 is thus in the modify portion of its read, modify and write cycle.

At time T8, data memory timing and control unit 444, in cooperation with CAS select logic 478, again activates CAS signal 484, which latches column address 530 into data memory module 418. Again, because OE 458 is still active, the contents of the addressed data memory location are immediately read out to data bus 470 as data packet 532. Note again that the addressed location includes row address 514 which was latched into data memory module 418 at T2.

At time T9, address mux 440 outputs a fourth X-bit column address 534 on bus 442, which, in the preferred embodiment is identical to address 530, with the exception of the two least significant bits which, in address 534, are incremented by one over address 530.

Also at time T9, cache status write enable CS_WE 438 is activated. Cache status programmable control logic 468 continues to output cache status supplemental column address packet 520 on bus 474.

At time T10, data memory timing and control unit 444, in cooperation with CAS select logic 478, again activates CAS signal 484, which latches the X-bit column address 534 into data memory module 418. Again, because OE 458 is still active, the contents of the addressed data memory location are immediately read out to data bus 470 as data packet 538.

Also at time T10, cache status timing and control unit 428 activates CS_CAS 434 which latches the Y-bit supplemental column address from bus 474 and the X-Y bits from bus 486 into cache status memory 422. Because neither of these address signal groups have changed since T4, the same column address packet 520 is latched into cache status memory 422 at T10 as at T4. Data packet 540 is then written from cache status data bus 472 into the addressed cache status memory location. Cache status memory 422 is thus in the write portion of its read, modify and write cycle.

The significance of the cache status addressing scheme described above is that data packet 540 is written into the same the cache status memory location at T10 from which data packet 524 was read out at time T4. This addressing scheme thus insures that a single cache status memory location maintains ownership data for a whole page of data memory. Moreover, this addressing scheme eliminates unnecessary reads of data memory 418–420.

Figure 6:
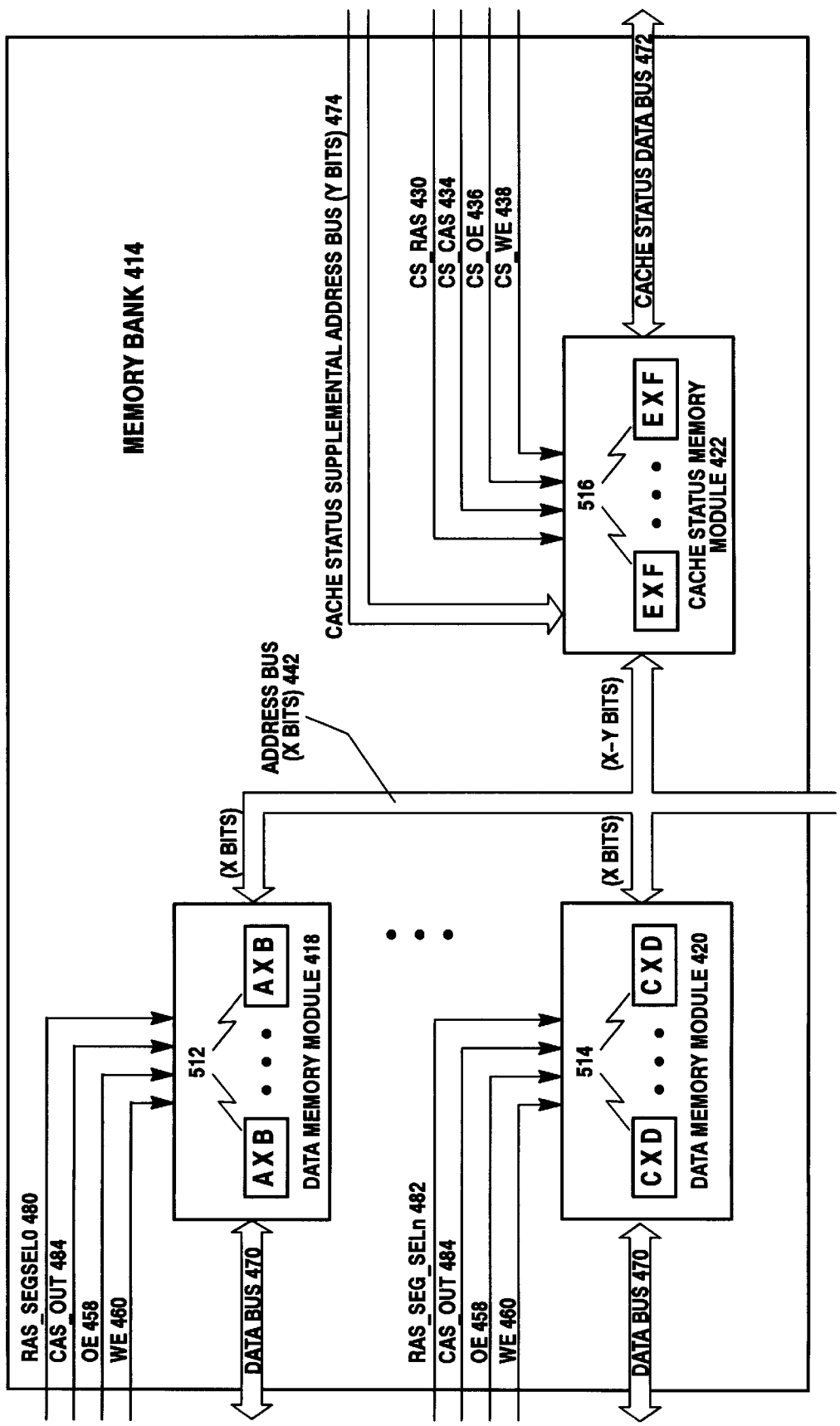
FIG. 6 is a detailed block diagram of a single memory bank, in accordance with the present invention.

Referring to FIG. 6, a detailed block diagram of memory bank 414 provides various possible memory configurations for system 410. Bank 414 includes up to n data memory modules 418–420 and a single cache status memory module 422.

Data memory module 418 includes a number of individual memory ICs 512. Each IC 512 has an identical size A×B, where A refers to the memory depth of the chip in megawords, and B refers to the width of the memory in bits. Memory IC 512 may be, for example, a 16M×8-bit memory IC. ICs 512, are cascaded together so that data memory module 418 has a depth A and a variable width determined by the number of ICs 512. Where, as in the preferred embodiment, a data word is 63 bits wide, a total of 8 ICs 512 will be required to provide a 64 bit wide word.

Similarly, data memory module 420 includes a number of individual memory ICs 514 cascaded together. Each IC 514 comprises a C×D array where C refers to the depth in mega-words and D refers to the width in bits. While C and D may be equal to A and B, respectively, it is not necessarily so. In the above example, where memory ICs 512 are 16 mega-words deep by 8 bits wide, memory ICs 514 may be, for example, only 2 mega-words deep by 4 bits wide. In order to achieve the desired word length of 63 bits, a total of 32 memory ICs 514 must be cascaded together in data memory module 420.

ICs 512–514 have similar address, timing and control schemes. In the preferred embodiment, address bus 442 is 13 bits wide so that in a row/column addressing scheme, there are 13 addressable rows and 13 addressable columns. This essentially provides 26 addressable bits which can address 64M addresses. Thus, one or more data memory modules 418–420 may provide as much as 64 megawords of data memory capacity. Where less than the maximum amount of data memory is employed, one or more data memory address lines of bus 480 will go unused.

Cache status memory module 422 includes a number of individual memory ICs 516, each having a capacity E mega-words deep, by F bits wide. Again, in order to create a desired word length, the number of memory ICs 516 cascaded within module 416 will depend on the width F of IC 516 and the desired word-length. In the preferred embodiment, where a cache status memory word is 24 bits wide, the required number of individual memory ICs 516 is achieved by dividing 24 by F.

Memory bank 414 preferably has from one to four data memory modules 418–420. The actual number is determined at the time of manufacture. In the preferred embodiment, however, memory bank 414 employs plug-in devices (not shown) for receiving individual memory ICs, at least for data memory modules 418–420. As a result, only the maximum number of data memory modules in memory bank 414 need be determined at the time of manufacturing. Thus, in a memory device having, for example, four data memory modules, memory devices need only populate one, two or three of those modules. Likewise, in a memory device having only two memory modules, only one of those modules need be populated. The configuration of individual data memory modules is, therefore, not fixed but variable, depending upon the needs of the user.

As will be described below, programmable control logic 468 provides the necessary flexibility for controlling any of a variety of configurations of memory bank 414, regardless of whether plug-in devices are employed.

Because the individual memory ICs within each data memory module 418–420 may be altered at any time after manufacture, it is important that status memory module 422 contain ICs 512 having a sufficient depth to accommodate any range of ICs which might be employed in memory modules 418–420.

Programmable control logic 468 divides cache status memory into a number of equal sized segments, based on the maximum number of data memory modules. Each segment is reserved for storing cache status or ownership data for an associated data memory module. In a four word per page mode, each cache status segment must have at least one quarter (¼) the number of words as the associated data memory module. However, because each cache status segment is divided into a number of equal size segments, in practice, each cache status segment must have at least one quarter (¼) the number of words as the largest data memory module in a memory bank.

Where, for example, four data memory modules are employed, cache status memory is divided into four equal segments, regardless of how any of the four modules are populated. If one or more data memory modules is unpopulated or under populated with respect to another data memory module, the associated segment of cache status memory goes unused or under utilized. The required cache status size depends, therefore, not on the actual configuration of data memory modules 418–420, but rather, on the size of the largest data memory module within the group of data memory modules 418–420.

As a general rule of thumb, in a four data memory module per memory bank system, where a four word per page addressing scheme is employed, the number of words in the cache status memory must be equal to or greater than the number of words in the largest data memory module. In a two data memory module memory system, the number of words in the cache status memory must be equal to or greater than one half the number of words in the largest data memory module. Finally, in a one data memory module memory system, the number of words in the cache status data must be equal to or greater than one quarter (¼) the number of words in the data memory module.

No matter what the configuration, however, whether a one, two, three or four data memory module per bank memory system, programmable control logic 468 can generate the necessary address signal to access cache status memory module 422 concurrently with data memory modules 418–420.

Referring to FIG. 7, a schematic diagram of a two memory bank, two memory modules per bank, memory system 710 is shown.

Memory system 710, includes an ASIC memory controller 712 for controlling access to a memory device 713. Memory device 713 includes a first memory bank 714 and a second memory bank 716. Memory bank 714 includes first and second data memory modules 718 and 720, respectively, and a cache status memory module 722. Memory bank 716 includes first and second data memory modules 728 and 730, respectively, and cache status memory module 732.

Data memory modules 718, 720, 728 and 730 each include sixteen, 16 mega-word by 4 bit, DRAM ICs cascaded to provide a 16 mega-word data memory storage, each word being 64 bits wide. Since there are two data memory modules per memory bank, each bank stores up to 32 mega-words of data memory.

Recall that, although data memory banks 714 and 716 are shown with two data memory modules each, bank 714 could, instead, have only a single module while bank 716 could have up to four data memory modules. Moreover, there is no requirement that the type of data memory devices populating one particular data memory module correspond to that employed by any other. For example, in FIG. 7, data memory module 720 could have a depth of two, four or eight megawords, rather than 16 mega-words. Data memory module 720 could even be left unpopulated. The memory capacity of data memory module 720 could even be increased above 16 mega-words, provided that status memory module 722 was appropriately increased. In the two module per bank system shown, one of the data memory modules can have more or less storage capacity than the other module.

In system 710, where data memory modules 718, 720, 728 and 730 are accessed in a four word-per-page mode, cache status memory modules 722 and 732 only need to store one word of cache status data for every four words of data memory. Recall, however, that programmable control logic 468 divides cache status memory according to the number of data memory modules. Here, where there are two data memory modules 718 and 720, cache status memory module 772 is divided into two equal segments. Since the number of words in one of the segments must be at least one quarter (¼) the number of words in the largest data memory module, the number of words in the other segment, being of equal size, will also be at least one quarter (¼) the number of words in the largest data memory module. Thus, where, as here, data memory module 718 has 16M words, one half of cache status memory 772 must be twenty five percent of 16 or 4M words. The whole of cache status memory module 772, therefore, must be 8M words, even if data memory module 720 is unpopulated.

Turning to control of memory device 713, ASIC memory controller 712 generates four sets of signals for controlling access to memory banks 714 and 716. A first set of signals 734 controls access to data memory modules 718 and 720 in memory bank 714. A second set 736 controls access to cache status memory module 722 in bank 714. A third set 738 controls access to data memory modules 728 and 730 in bank 716. And a fourth set 740 controls access to cache status memory module 732 in bank 716.

First set of control signals 734 include row address strobe signals B1SEGSEL_PO(0), BISEGSEL_PO(1), DB1RAS0_L_PO, and DB1RAS1_L_PO, output onto lines 742, 744, 746 and 748, respectively. These SEGSEL and RAS signals are received by RAS select logic 750 which, in turn, outputs up to 8 individual row address strobe signals B1RAS_SEG_SEL0 through B1RAS_SEG_SELn, onto lines 770–784, respectively, for indicating a valid row address on address bus DB1ADR_PO(12-0) 756.

Note that in a two data memory modules per memory bank system such as this, only two BIRAS_SEG_SEL signals are required, namely, BIRAS_SEG_SEL0 770 and BLRAS_SEG_SEL1 772; the other six go unused. Note also that, although RAS select logic 750 is shown as two groups of single pole, double throw semiconductor switches, any other suitable configuration of logic circuits could be employed. Moreover, RAS select logic 750 could be designed to output, based on the four signal inputs, up to sixteen individual RAS signals rather than just eight.

First signal group 734 also includes column address strobe signals DB1CASA_L_PO 752 and DB1CASB_L_PO 754, for indicating a valid column address on DB1ADR_PO(12-0) 756. In the preferred embodiment, since a separate RAS signal is provided to each memory module within a bank of memory, there is no need for separate column address strobes for each data memory module. Instead, common CAS signal DB1CASA_L_PO 752 is provided to data memory modules 718–720. DB1CASB_L_PO 754 may go unused or may be used as a duplicate of CASA in order to reduce loading. For example, CASA could go to data memory module 718 while CASB could go to module 720. In either event, each data memory module in a bank will receive a column address strobe and a column address strobe, regardless of whether the memory controller will access that data memory module. The deciding factor as to which data memory module is accessed is which data memory module receives a row address strobe signal.

A 64 bit data memory data bus 724 is provided for transmitting data bits DATA_PB(54-0) and error correction bits DATAECC_PB(7-0) between ASIC controller 712 and memory bank 714. Although data memory data bus 724 is common to both memory banks 714 and 716, separate data busses (not shown) could, just as easily, be supplied to each memory bank.

Signal group 734 also includes write enable signal DB1WE_L_PO 786 for writing data from data bus 724 into an addressed portion of data memory and output enable signal DB1OE_L_PO 788 for reading the contents of an accessed portion of data memory onto data bus 724.

A thirteen bit cache status memory address includes the eleven most significant bits of DB1ADR_PO(12-0) 756 and a two bit supplemental cache status address CSB1ADR_L_PO(1-0) 766.

Second group of signals 736 for controlling cache status module 722 include row address strobe CSB1RAS_L_PO 758 for indicating a valid cache status row address on cache status address bus CSB1ADR_L_PO(1-0) 766 and data memory address bus DB1ADR_PO(12-2) 768. Control signals 736 also include column address strobe signal CSB1CAS_L_PO 760 for indicating a valid column address on address bus lines 766 and 768.

Second group of signals 736 includes write enable signal CSB1WE_L_PO 764 for writing the contents of cache status data bus 726 into an addressed portion of cache status memory. Signals 736 also include output enable signal CSB1OE_L_OP 762 for reading the contents of an addressed portion of cache status memory onto data bus 726.

Cache status data bus 726 is shown as a twenty-four bit bus for transmitting cache status data bits CSD_PB(16-0) and error correction bits CSDECC_PB(6-0). Although data bus 726 is common to both memory banks 714 and 716, separate data busses (not shown) could just as easily be supplied to each memory bank.

In operation, upon receipt of a request for access to a particular data memory location of bank 714, ASIC memory controller 712 generates the necessary signals from group 734 and 736 for accessing a page of data memory stored in data memory modules 718–720, while concurrently accessing an associated word of cache status memory stored within cache status memory module 722. ASIC controller 712 can provide access to bank 714 to a first requestor while concurrently providing access to bank 716 to a second requestor.

Figure 8A:
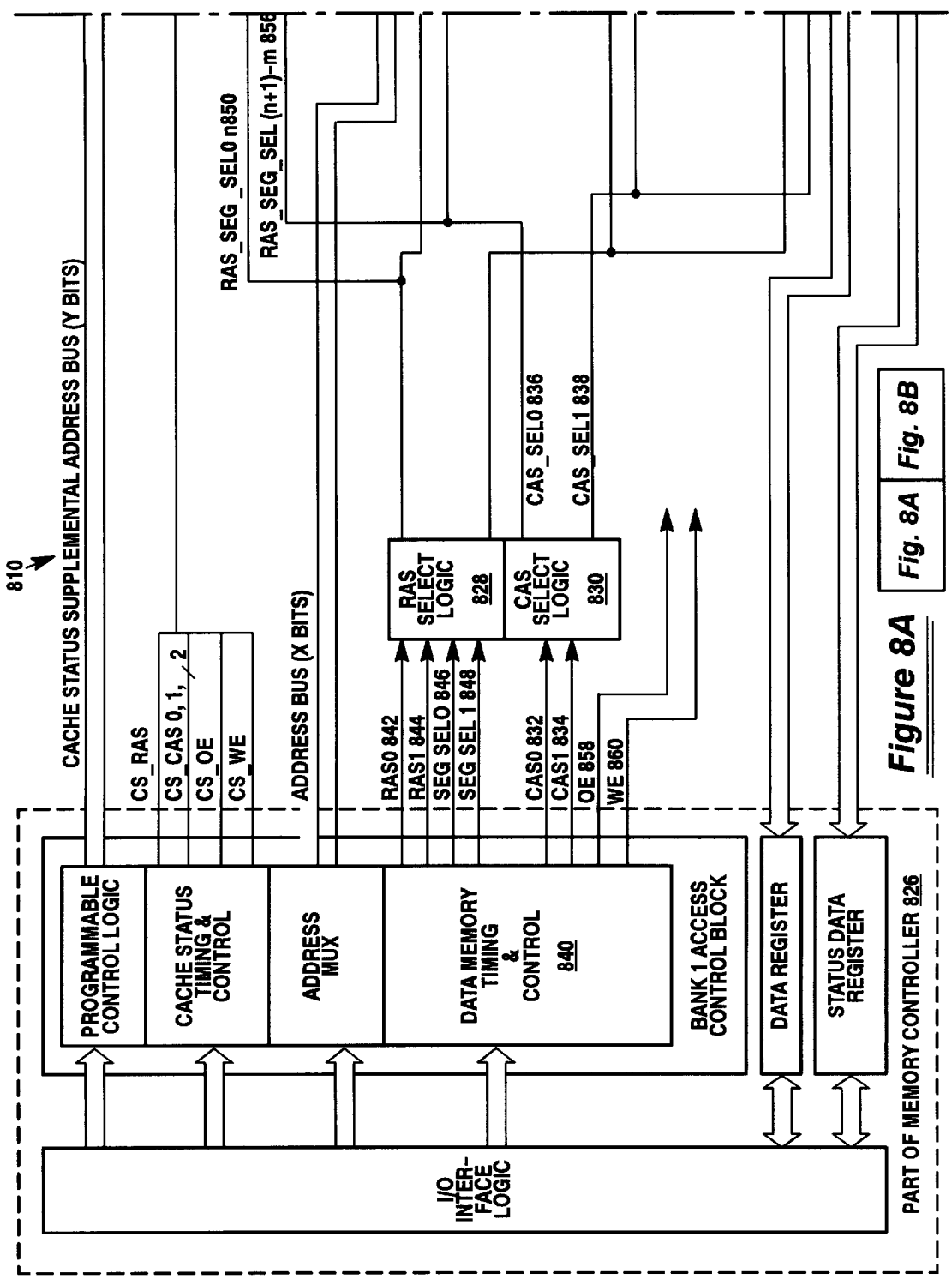
FIG. 8 is a detailed block diagram of an alternative embodiment of the present invention where a memory system includes two segments of memory per bank of memory.
Figure 8B:
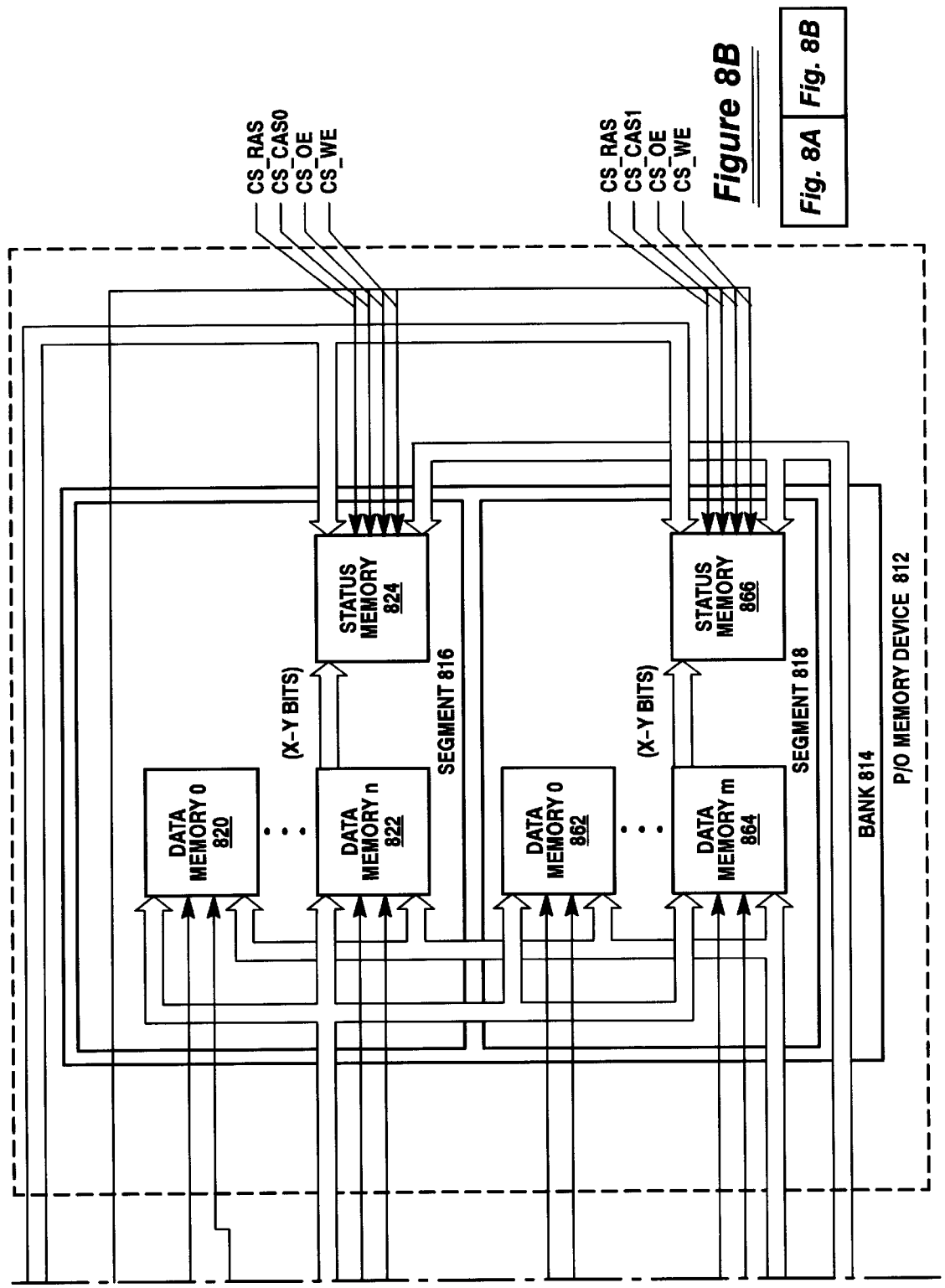

Referring to FIG. 8 an alternative embodiment of the present invention is shown where a memory system 810 includes a memory device 812 having up to eight data memory modules per bank.

In order to provide up to eight data memory modules per bank, a memory bank 814 is divided into first and second segments 816 and 818, respectively. Segment 816 includes n data memory modules 820–822 and a distinct cache status memory module 824. Segment 818 includes m data memory modules 862–864 and a distinct cache status memory module 866. In a preferred embodiment, n and m may be any number from one to four and do not have to equal each other.

A memory controller 826 provides necessary addressing, timing and control signals for controlling access to memory device 812. Because system 810 may have up to twice the number of data memory modules and cache status modules as system 410, additional timing and control signals are necessary for controlling access to memory device 812. Although many possible schemes could be devised for controlling memory device 812, in the preferred embodiment, memory controller 826 is substantially similar to memory controller 412 of FIG. 4, with the exception of column address strobe signal generation.

Data memory timing and control unit 840 generates row address strobe signals RAS0 842, RAS1 844, SEG_SEL0 846 and SEG_SEL1 848 similar to those found in system 410. These signals are fed to RAS select logic 828 which outputs up to eight row address strobe signals, RAS_SEG_SEL0–7, 850–856. RAS_SEG_SEL0–3 are supplied to data memory 820–822 in data segment 816, so that each data memory 820–822 receives a distinct row address strobe. Similarly, each data memory 862–864 in data segment 818 receives a distinct row address strobe RAS_SEG_SEL4–7.

Data memory timing and control unit 840 also generates output enable OE 858 and write enable 860 for controlling reading and writing of memory device 812. Although not shown, these signals are supplied to each data memory module in segments 816 and 818.

Identical column address strobes CAS_SEL0 836 and CAS_SEL1 838 are supplied to data memory modules 820–822 and 862–864, respectively. In all other aspects, systems 810 operates similar to system 410.

Additional sub-banks of memory could be included within memory device 812, using any of a variety of combinations of RAS signals 216 and 218, segment select signals 220 and 222, and CAS signals 230 and 232.

III. Programmable Control Logic

A major drawback to current memory systems is the lack of memory configuration flexibility. This is because existing memory controllers, including commercially available DRAM controllers, are hardware-based, non-reconfigurable devices. While there are a variety of memory controllers available, each is typically designed for a specific memory device or IC. Thus, for a 16 mega-word memory IC having a specified addressing scheme of, for instance, 13 row bits and 13 column bits, there are one or more memory controllers specifically designed to control that particular type of memory IC. Once a memory controller is chosen for a system, the memory configurations available to that system are limited.

Another key aspect of the present invention, therefore, is to employ programmable control logic to enable a memory controller to control access to any of the variety of the data memory and cache status memory configurations, disclosed above. In the preferred embodiment, programmable control logic accomplishes this regardless of the maximum number of data memory modules employed, the maximum size of the data memory modules employed and the number of cache status addressable column bits. In the preferred embodiment, programmable control logic is included within the ASIC memory controller itself, although it could be incorporated as a separate device along with a commercial off the shelf memory controller.

Figure 9:
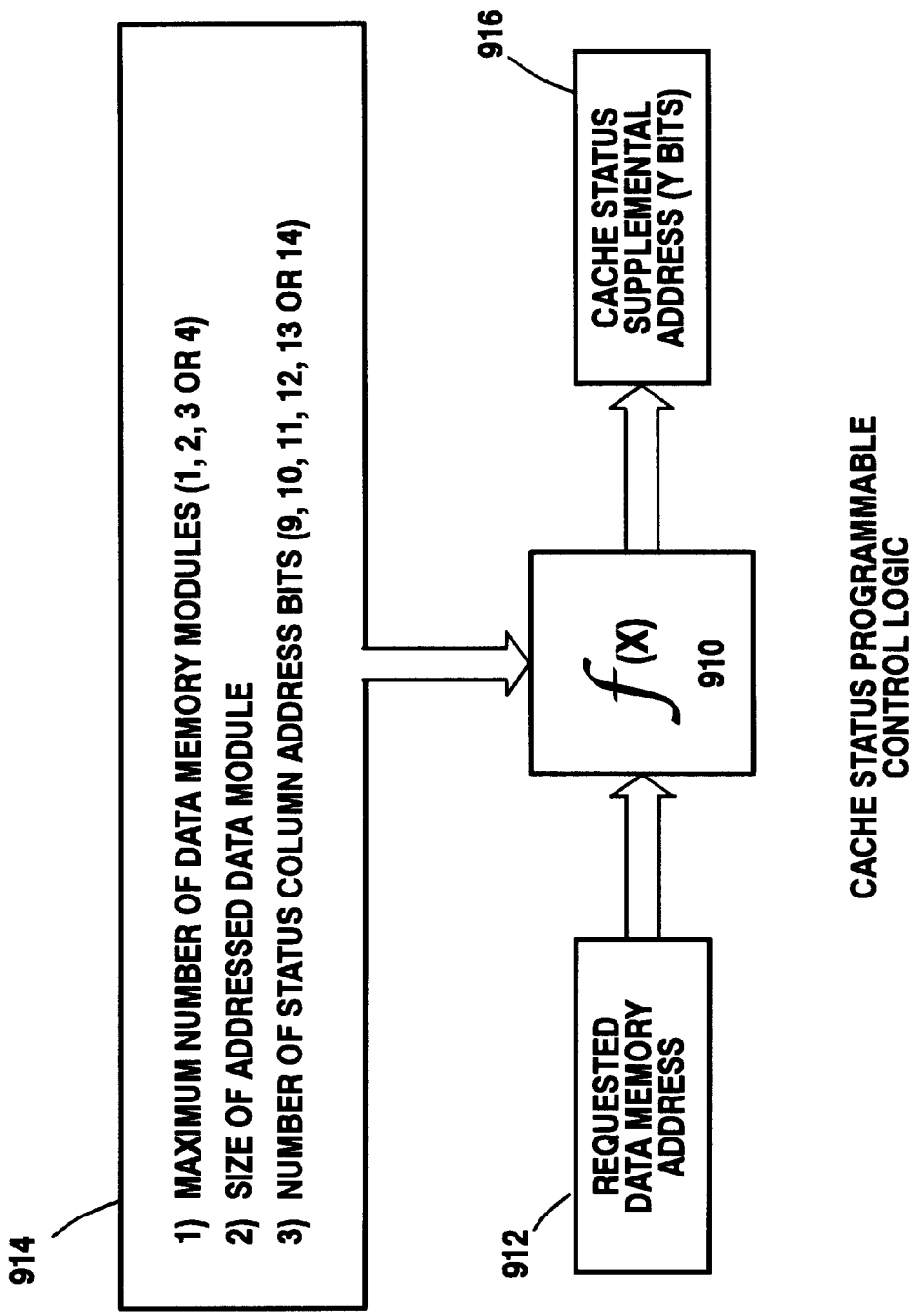
FIG. 9 is a high-level block diagram of programmable control logic employed for generating supplemental cache status memory address bits.

Referring to FIG. 9, a high-level block diagram of programmable control logic is shown as an F(x) function 910 for generating a supplemental cache status memory address based on configuration of memory employed.

Programmable control logic 910 receives a requested data memory address 912 from a requestor and memory configuration data from data block 914. In the preferred embodiment, data block 914 includes the maximum number of data memory modules contained within a memory bank, the size of the addressed data memory module within a bank of data modules, and the number of cache status column address bits employed by status memory ICs.

Based on the two blocks of input data 912 and 914, programmable logic control 910 generates Y bits of supplemental cache status address 916 for accessing, in conjunction with a portion of a data memory address, a cache status memory module.

Figure 10A:
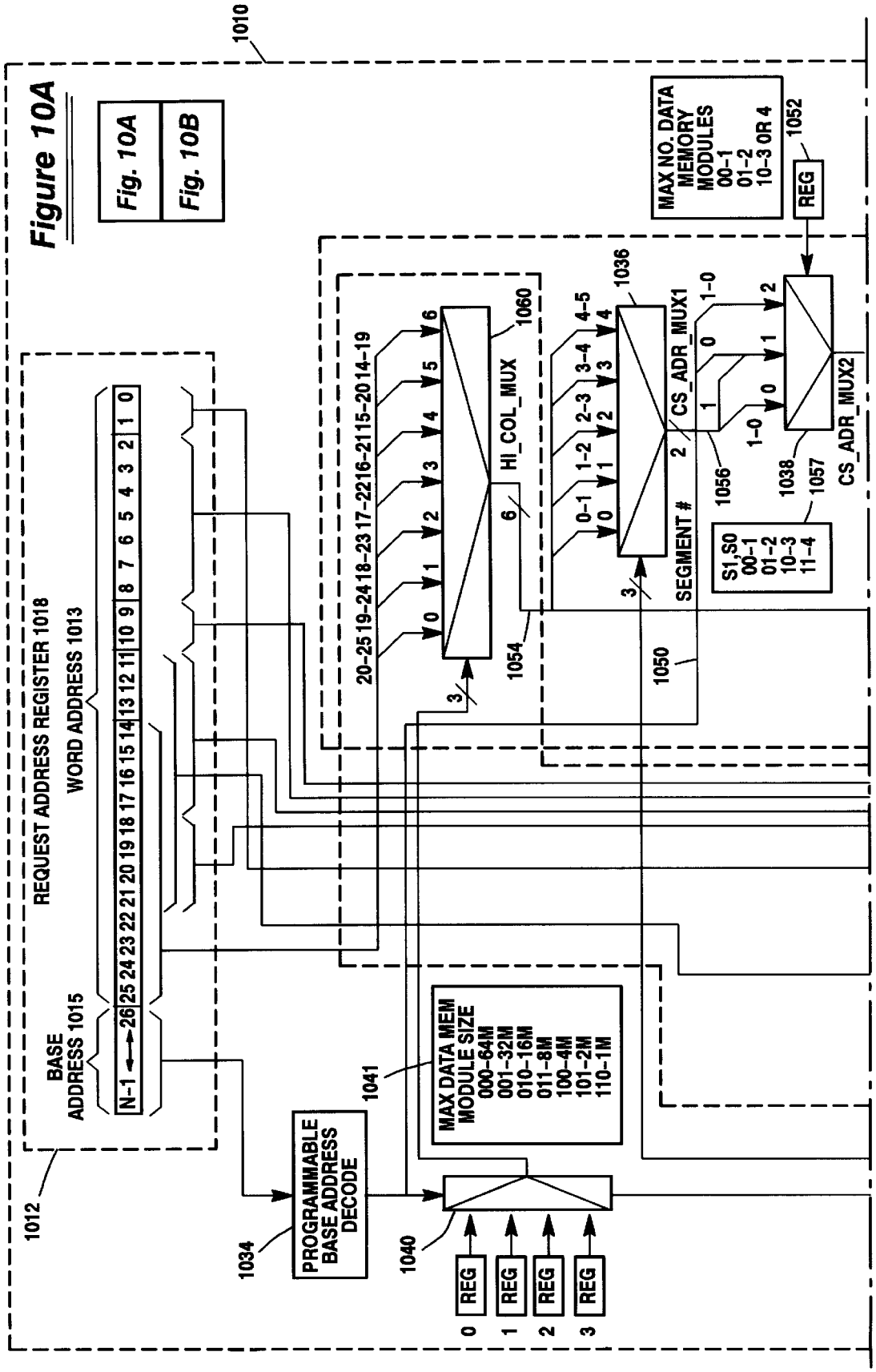
FIG. 10 is a logic diagram of the programmable logic of FIG. 9.
Figure 10B:
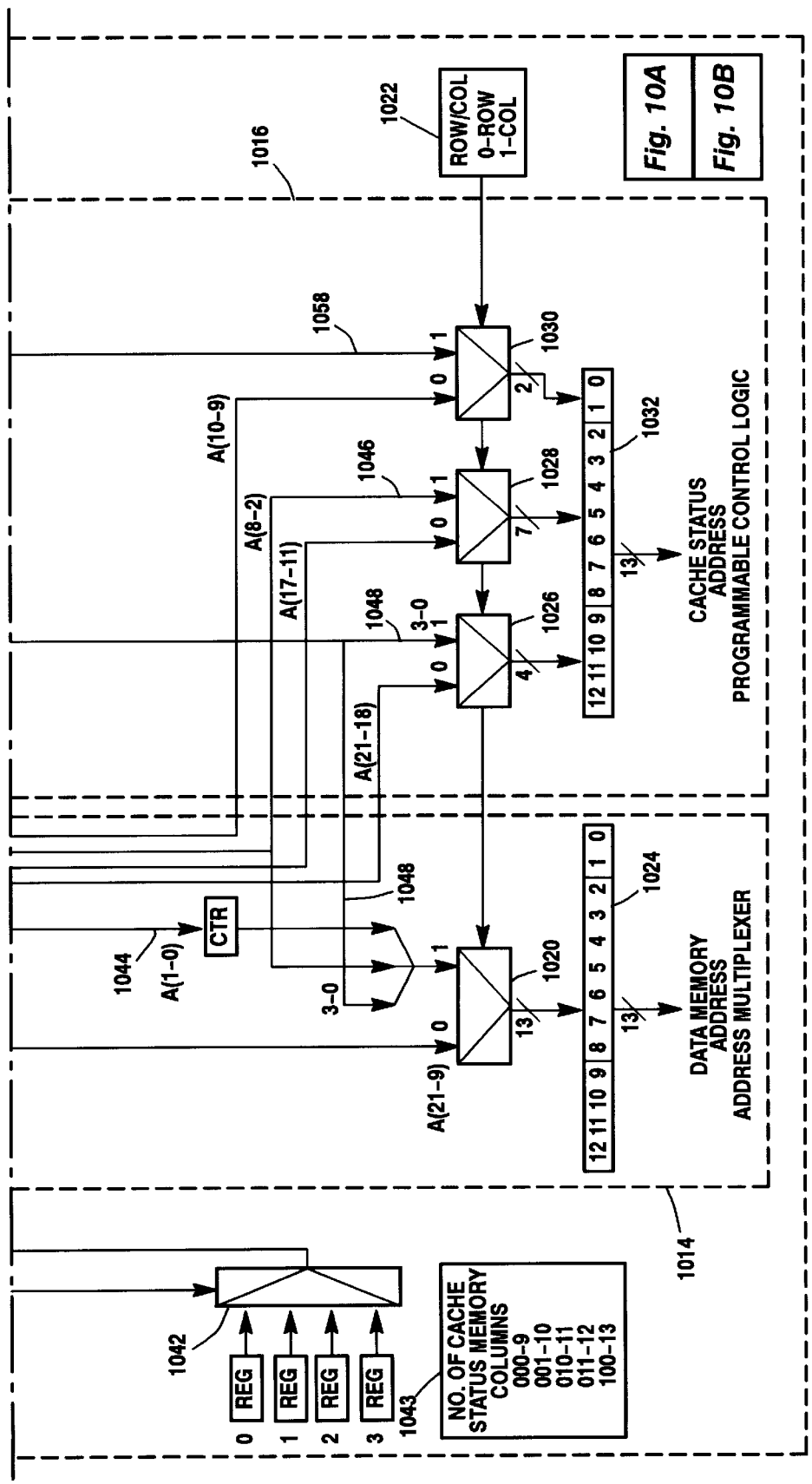

Referring to FIG. 10, a portion 1010 of an ASIC memory controller includes I/O interface 1012 for receiving a requested address and for providing the requested address to address multiplexer 1014 and to programmable control logic 1016. Address multiplexer 1014 multiplexes data memory row and column address bits onto data memory address bus 1024. Programmable control logic 1016 outputs cache status memory row and column address bits onto cache status address bus 1032. In the preferred embodiment, address multiplexer 1014 and programmable control logic 1016 share one or more logic elements.

I/O interface 1012 includes a request address register (RAR) 1018 for latching an n-bit address request. In the preferred embodiment, a requested address is 31 bits wide. The 26 least significant bits of those 31 bits hold the requested data memory address 1013. The most significant remaining bits, referred to as a base address 1015, may contain information for selecting a memory controller bank and segment.

A programmable base address decoder 1034 decodes the various information contained in base address portion 1015 and outputs data memory and cache status related selection information to multiplexer 1040, multiplexer 1042 and CS_ADR_MUX2 multiplexer 1038.

Multiplexer 1040 outputs the size of the addressed data memory module in a bank of memory to HI_COL_MUX 1060. In the preferred embodiment, possible data memory module sizes include 1M, 2M, 4M, 8M, 16M, 32M and 64M. Because there are seven possible sizes, mux 1040 outputs a three bit signal, in accordance with table 1041 shown next to mux 1040.

Multiplexer 1042 outputs the number of cache status addressable column bits to CS_ADR_MUX1 1036. In the preferred embodiment, cache status memory modules may have 9, 10, 11, 12 or 13 addressable columns. Because there are 5 possible output values, mux 1042 outputs a three bit signal, in accordance with table 1043 shown next to mux 1042.

Base address decoder 1034 supplies a cache status memory segment number which identifies the cache status memory segment associated with a requested data memory module address. This number is supplied to CS_ADR_MUX2 mux 1038, the operation of which is described below.

Although busses 1024 and 1032 are shown as separate busses, in the preferred embodiment cache status memory receives the most significant 11 bits of data memory address bus 1024 and only the two least significant bits of cache status address bus 1032. This is because output address bits 13-2 of data memory address bus 1024 and cache status address bus 1032 are identical, as will be described below. By sharing a substantial portion of data memory address bus 1024, a substantial amount of real estate is conserved in the memory system.

Regarding data memory address mux 1014, data memory address output mux 1020 outputs data memory row and column address bits to data memory address bus 1024, based on an output from row column select logic 1022. A column address is output when row/column select logic 1022 outputs a one. In that case, data memory output mux 1020 simply passes RAR 1018 bits 21-9 directly through to address bus 1024, bits 12-0, respectively.

A row address is output when row/column select logic 1022 outputs a zero to data memory output mux 1020. The row address includes a combination of three groups of signals. The first group of signals 1044 includes bits 1 and 0 of RAR 1018, output as bits 1 and 0, respectively, of data memory address bus 1024. The second group of signals 1046 includes bits 8-2 of RAR 1018, output as bits 8-2, respectively, of data memory address bus 1024. The third group of signals 1048 includes the four least significant output bits 3-0 of HI_COL_MUX 1060, output as data memory address bits 12-9, respectively.

HI_COL_MUX 1026 receives RAR 1018 bits 14-25 in seven groups of six bits, and outputs one of those seven groups based on the addressed data memory module size, as received from multiplexer 1040. Note that the seven groups of RAR 1018 bits are input to HI_COL_MUX 1060 reversed with respect to the order in which they appear in RAR 1018. For example, input port 0 of HI_COL_MUX 1060 receives RAR 1018 bits 20-25, in that order, rather than as bits 25-20, as shown in RAR 1018. HI_COL_MUX 1060 thus treats RAR bit 25 as being less significant than RAR bit 20. This reversal of bits permits various R/C ratios in data memory.

Referring to FIG. 11, Table 1 shows HI_COL_MUX 1060 outputs for various data memory module sizes. Suppose, for example, that the addressed data memory module size is 64M. Multiplexer 1040 outputs a 000, which selects HI_COL_MUX 1060 input port 0. Recalling that input port 0 receives RAR 1018 bits 20-25, these bits are output by HI_COL_MUX 1060 onto line 1054, with RAR bit 20 being the most significant bit and RAR bit 25 being the least significant. HI_COL_MUX 1060 outputs are also provided for data memory module sizes of 1M, 2M, 4M, 8M, 16M and 32M.

Returning to the discussion of data memory column addressing, recall that the third group of signals 1048 includes the four least significant output bits 3-0 of HI_COL_MUX 1060. These bits, 3-0, are output by data memory output mux 1020 as bits 12-9, respectively. In the example above, where the addressed data memory module is 64M, HI_COL_MUX 1060 outputs RAR bits 20-25 onto bus 1054. The four least significant output bits of HI_COL_MUX 1060, RAR bits 22-25, therefore, are output by data memory output mux 1020 as data memory column address bits 12-9, respectively.

For the example above, therefore, the 13 bit data memory column address for a 64M data memory module will include RAR bits 22, 23, 24, 25, 8, 7, 6, 5, 4, 3, 2, 1, 0, in that order. Note that the data memory column address is independent of the number of data memory modules and the number of cache status column address bits.

Cache status memory addresses are generated by programmable control logic 1016 as follows.

A cache status row address is selected when row/column select logic 1022 outputs a zero to cache status output muxes 1026, 1028 and 1030. Upon receiving a logic low signal from row column select logic 1022, cache status output mux

1026 outputs RAR bits 21-18 as cache status address bus 1032 bits 12-9, respectively. Simultaneously, upon receiving a logic low, cache status output register 1028 outputs RAR bits 17-11 as cache status address bus 1032 bits 8-2, respectively. Likewise, cache status output mux 1030 outputs RAR 1018 bits 10 and 9 as cache status address bus 1032 bits 1 and 0, respectively.

Cache status output muxes 1026, 1028 and 1030, therefore, upon receiving a logic low from row/column select logic 1022, outputs RAR bits 21-9 as cache status memory row address bits 12-0, respectively. Recall that data memory output mux 1020, upon receiving the same logic low signal, also outputs RAR bits 21-9 as row address bits 12-0, respectively. Thus, identical row addresses are simultaneously multiplexed out of memory controller 1010 to a data memory and a cache status memory.

A cache status column address is selected when row/column select logic 1022 outputs a logic high to cache status output muxes 1026, 1028 and 1030. Upon receiving a logic high from row column select logic 1022, output mux 1026 outputs the four least significant output bits of HI_COL_MUX 1060, bits 3-0, as cache status address bus 1032 bits 12-9, respectively. Recall that the operation of HI_COL_MUX 1060 was described in the description of the data memory column addressing, above. Cache status column address bits 12-9, thus, are identical to data memory column address bits 12-9.

Upon receiving a logic high from row column select logic 1022, output mux 1028 outputs RAR bits 8-2 as cache status memory address bus 1032 bits 82, respectively. Recall from above that data memory column address bits 8-2 also include RAR bits 8-2, respectively.

Cache status memory column address bits 12-2 are, therefore, identical to data memory column address bits 12-2. Recalling that cache status row address bits 12-2 are identical to data memory row address bits 12-2, in the preferred embodiment, cache status memory and data memory share a common address bus for address bits 12-2.

The two least significant column address bits of cache status memory address bus 1032, however, are not in common with data memory address bus 1024. Instead, cache status column bits 1 and 0, output by cache status output mux 1030, depends on one or more of: the number of cache status column address bits, represented by the three bits output from #CS_COLS multiplexer 1042; the desired cache status memory segment number, received from base address decoder 1034 on line 1050; the maximum number of data memory modules in a bank of memory, received from register 1052; the size of the addressed data memory module, represented by the three output bits of mux 1040; and, of course, a portion of RAR address 1018 bits 25-14 output by mux 1060. 5 Briefly, the two LSBs of cache status memory column address on bus 1032 are generated by multiplexing the six output bits 1054 of HI_COL_MUX multiplexer 1060 through CS_ADR_MUX1 multiplexer 1036 and multiplexing the 2 output bits 1056 of CS_ADR_M1 multiplexer 1036 through CS_ADR_MUX2 1038.

CS ADR MUX1 multiplexer 1036 is a five to one multiplexer which receives the six output bits of HI_COL_MUX 1060 over line 1054, evenly divided among five input ports, 0–4. HI_COL_MUX 1060 bits 0-5 are applied to CS_ADR_MUX1 input ports 0–4, 2 bits per port, and are multiplexed onto line 1056 based upon the number of addressable cache status memory columns, as provided by multiplexer 1042.

Referring to FIG. 11, Table 2 is provided for CS_ADR_MUX1 mux 1036. Table 2 provides outputs of CS_ADR_MUX1 mux 1036 for each number of cache status column address bits, as provided by mux 1042. Where, for example, the number of cache status columns is nine, CS_ADR_MUX1 mux 1036 outputs HI_COL_MUX 1060 bits 0 and 1 on bus 1056 lines 1 and 0, respectively. If, instead, the number of cache status memory columns is ten, CS_ADR_MUX1 outputs HI_COL_MUX bits 1 and 2 on bus 1056 lines 1 and 0, respectively.

Referring back to FIG. 10, CS_ADR_MUX2 1038 receives the two output bits from CS_ADR_MUX1 mux 1036. CS_ADR_MUX2 1038 is a three to one multiplexer which receives the two bits of CS_ADR_MUX1 output from line 1056 at port 0, the most significant bit of line 1056 plus the least significant bit of line 1050 at port 1 and both bits of line 1050 at port 2. Bus 1050 carries a 2 bit signal indicating the requested data memory module, according to table 1051, shown next to CS_ADR_MUX2 1038. Recall that a cache status memory module is divided into a number of segments equal to the maximum number of data memory modules in a memory bank. CS_ADR_MUX2 1038 is controlled by register 1052, which provides the maximum number of data memory modules in a bank of memory.

Referring to FIG. 11, Table 3 is provided for CS_ADR_MUX2 1038. Table 3, provides outputs of CS_ADR_MUX2 mux 1056 for each maximum number of data memory modules provided by register 1052. Where, for example, a memory bank is designed for only one data memory module, register 1052 selects CS_ADR_MUX2 1038 input port 0 for output. Since input port 0 receives bits 1 and 0 of line 1056, these bits are output from CS_ADR_MUX1 1036 onto line 1058 as bits 1 and 0, respectively.

Where, however, a memory bank is designed for two data memory modules, CS ADR MUX2 1038 outputs the MSB of line 1056 and the LSB of line 1050 onto line 1058 as bits 1 and 0, respectively. Finally, if a memory bank is designed for 3 or 4 data memory modules, CS_ADR_MUX2 1038 outputs bits 1 and 0 of line 1050 as bits 1 and 0, respectively, of line 1058.

It is these 2 bits of data on bus 1058 which is output by cache status output mux 1030 as cache status column address bits 1 and 0.

Recall that where a memory bank is designed for 3 or 4 data memory modules, the associated cache status memory is divided into 4 segments, represented on line 1050 as S1 and S0, where S1 is the most significant bit. Since, according to Table 3, S1 and S0 are output onto bus 1058 by CS_ADR_MUX2 1038, S1 and S0 become cache status column address bits 1 and 0, respectively. In this case, cache status column address bits 1 and 0 signify which of the four cache status segments is being accessed.

Similarly, where a memory bank is designed for two data memory modules, the associated cache status memory is divided into only two segments.

According to Table 3, where there are only two data memory modules, S0 is output onto line 1058, which then becomes cache status column address bit 0. In this scenario, cache status column address bit 0 indicates which of the two segments is being accessed.

Note that cache status column address 1032 never depends on RAR 1018 bits 1 and 0. Yet, recall that data memory column address bits 1 and 0 are always identical to RAR bits 1 and 0. This simple fact provides the basis for sequentially accessing four words of data memory while concurrently accessing only one word of cache status memory.

In operation, an n+1 bit address, preferably a 31 bit address, is latched into RAR 1018. A 13 bit row address is taken from that 31 bit address and latched into a data memory and a cache status memory. Thereafter, a 13 bit data memory column address is taken from the 31 bit address and latched into the data memory. At the same time, a 13 bit cache status memory column address is generated in accordance with the description above and latched into the cache status memory. At this point, the addressed data memory can be read from or written to, concurrently with a read from or a write to the addressed cache status memory location.

Thereafter, RAR bits 1 and 0 of the n+1 bit address are incremented by one. If bits one and zero had been 0 and 0, respectively, therefore, they would now be 0 and 1, respectively. A new data memory column address is then taken from RAR 1018 and latched into the data memory, in place of the prior column address. In fact, the new data memory column address is actually the next consecutive data memory column address. Since cache status column address bus 1032 does not rely on RAR bits 1 and 0, incrementing only those bits causes no change in the cache status column address. At this point, therefore, a second data memory location can be read from or written to, concurrently with a read from or a write to the original cache status memory location.

This process is repeated two more times so that a total of four consecutive data memory locations are consecutively accessed concurrently with one or more accesses to a single cache status memory location. This concurs with the timing diagram of FIG. 5.

Note that, since data memory column address bits 2-12 and cache status column address bits 2-12 are identical, and because data memory row address bits 2-12 and cache status row address bits 2-12 are also identical, data memory address bus 1024 bits 2-12 and cache status address bus 1032 bits 2-12 could easily be combined into a single bus, as shown in FIGS. 4, 7 and 8. Additionally, although high column address mux 1026 is shown as part of address mux 1014, and although cache status address mux 1036 and cache status address mux 1038 are shown as part of programmable control logic 1016, this distinction is primarily for the benefit of explanation. There is not, necessarily, any such distinction within the actual hardware of an ASIC memory controller.

Referring to FIG. 12, Table 4 provides a quick reference guide indicating the RAR bits which are output as data memory and cache status row addresses on busses 1024 and 1032, respectively, of FIG. 10. Upper row 1210 represents the bit positions of data memory and cache status address busses 1024 and 1032, respectively. Lower row 1212 represents RAR 1018 bit positions. As previously described, RAR bits 21-9 are output onto busses 1024 and 1032 as bits 12-0, respectively, and is not affected by data memory or cache status memory configurations.

Table 5 provides a quick reference column address guide for a memory system designed for one data memory module. Essentially, Table 5 indicates, for a one data memory module system, which RAR bits are output as data memory and cache status column addresses on busses 1024 and 1032, respectively, in FIG. 10.

Column 1214 indicates the size of the addressed data memory module in a memory bank. Rows 1216 through 1228 are provided for data memory modules of 1M, 2M, 4M, 8M, 16M, 32M and 64M, respectfully.

Column 1230 indicates the number of addressable cache status memory columns. Recall that in the preferred embodiment, the number of cache status columns range from 9 to 13. Column 1214 is divided into seven identical groups, one for each row 1216-1228. Each group includes the five possible numbers of cache status columns.

Column 1232 provides the RAR bits which are output as column address bits 12-2 of both data memory address bus 1024 and cache status memory bus 1032. Column addresses are provided for each combination of addressable cache status column and data memory module sizes. For example, where a 1M data memory module is employed in conjunction with a 9 column cache status memory module, data memory address bus 1024 and cache status memory bus 1032 output RAR bits 16, 17, 18, 19, 8, 7, 6, 5, 4, 3 and 2 as column address bits 12-2, respectively. In fact, column bits 12-2 depend only on the addressed data memory module size, not the number of cache status columns.

Column 1234 provides the RAR bits which are output as data memory column address bits 1 and 0. As previously described, RAR bits 1 and 0 are always output as data memory column address bits 1 and 0, respectively, for the first of four data word accesses.

Column 1236 provides the RAR bits which are output as cache status memory column address bits 1 and 0. Recall that these bits depend on the maximum number of data memory modules, the size of the addressed data memory module and the number of addressable cache status columns. In the above example, where the data memory module is 1M and the number of addressable cache status columns is 9, RAR bits 19 and 18 are output as cache status column address bits 1 and 0, respectively.

Referring to FIG. 13, Table 6 provides a quick reference column address guide for a memory system designed for two data memory modules. Table 6 indicates, for a two data memory module system, which RAR bits are output as data memory and cache status column addresses on busses 1024 and 1032, respectively, in FIG. 10.

Table 6 is similar to Table 5, with the exception of the right half of column 1310. In the right half column 1310, bit 0 of cache status column address bus 1032 is shown, not as an RAR bit, but rather, as S0. Recall from the description of FIGS. 10 and 11, where a memory bank is designed for two data memory modules, CS_ADR_MUX2 1038 outputs CS_ADR_MUX1 1036 bit 1 and base address decode output bit S0 as bits 1 and 0, respectively, of bus 1058. In a two data memory module system, S0 indicates which of two data memory modules is being addressed.

Referring to FIG. 14, Table 7 provides a quick reference column address guide for a memory system designed for three or four data memory modules. Table 7 indicates, for a three or four data memory module system, which RAR bits are output as data memory and cache status column addresses on busses 1024 and 1032, respectively, in FIG. 10.

Table 7 is similar to Table 6, with the exception of the left half of column 1410. In the left half of column 1410, bit 1 of cache status column address bus 1032 is shown, not as an RAR bit, but rather, as S1. Recall from the description of FIGS. 10 and 11, where a memory bank is designed for three or four data memory modules, CS_ADR MUX2 1038 outputs base address decode output bits S1 and S0 as bits 1 and 0, respectively, of bus 1058. Bits S1 and S0 indicate which of four data memory modules is being addressed.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A memory system, comprising:
 a data memory;

a status memory distinct from said data memory, wherein a word of said status memory stores a status of a corresponding page of said data memory;

a memory controller for generating control signals for accessing said data memory in an m word per page mode and for concurrently accessing said status memory in a word mode;

a data memory address bus coupled between said memory controller and said data memory; and a status memory bus, including a most significant bits (MSB) portion and a least significant bits (LSB) portion, said MSB portion comprising a portion of said data memory address bus coupled to said status memory, said LSB portion comprising a supplemental address bus coupled between said memory controller and said status memory.

2. The memory system according to claim 1, wherein:

said data memory comprises a number n of data memory modules configured to be accessed in a page mode; and said status memory comprises a status memory module configured to be accessed in a word mode.

3. The memory system of claim 2, wherein said status memory module has from 9 to 13 addressable columns.

4. The memory system of claim 2, wherein said number of data memory modules n is from 1 to 4.

5. The memory system of claim 2, wherein:

said number of data memory modules n equals 4;

said page size is four words; and said status memory module has a number of words which is at least as large a a number of words in a largest data memory module.

6. The memory system of claim 5, wherein n is greater than one and wherein fewer than n data memory modules are populated with memory devices.

7. The memory system of claim 2, wherein:

said number of data memory modules n equals 2;

said page size is four words; and said status memory module has a number of words which is at least half as large as a number of words in a largest data memory module.

8. The memory system of claim 7, wherein only one of said data memory modules are populated with a memory device.

9. The memory system of claim 2, wherein:

said number of data memory modules n equals 1;

said page size is four words; and said status memory module has a number of words which is at least a quarter as large as a number of words in a largest data memory module.

10. The memory system of claim 1, further comprising:

means for generating address and control signals for reading a page of data memory during a predetermined period of time; and means for reading, modifying and writing a status in a status memory location associated with the page of data memory during the predetermined period of time.

11. The memory system of claim 10, wherein the status memory location associated with the page of said data memory has a row address which is identical to a row address of the page of data memory.

12. The memory system of claim 1, further comprising:

means for generating address and control signals for writing a page of data memory during a predetermined period of time and for simultaneously reading, modifying and writing a status in a status memory location associated with the page of data memory during the predetermined period of time.

13. The memory system according to claim 1, wherein said memory controller comprises programmable control logic that generates supplemental addresses for said status memory as a function of:

(a) a requested data memory address;

(b) a maximum data memory module size;

(c) a maximum number of data memory modules; and (d) a number of status memory column address bits.

14. A memory system, comprising:

a memory controller at least one bank of memory comprising first and second memory segments, said first memory segment comprising a number n of data memory modules and an associated first status memory module, said second memory segment comprising a number m of data memory modules and an associated second status memory module;

a data memory address bus, coupled between said memory controller and said n and m number of data memory modules, for addressing said number n and m of data memory modules in a page mode; and a status memory address bus that addresses said first and second status memory modules in a word mode, said status memory address bus comprising a most significant bits (MSB) portion and a least significant bits (LSB) portion, said MSB portion comprising a portion of said data memory address bus coupled to said status memory modules, said LSB portion comprising a supplemental address bus coupled between said memory controller and said first and second status memory modules.

15. The memory system of claim 14, further comprising:

means for generating address and control signals for reading a page of data memory from any of said number n and m data memory modules during a predetermined period of time; and means for reading, modifying and writing a status in a status memory location associated with the page of data memory during the predetermined period of time.

16. The memory system of claim 14, wherein:

said number of data memory modules n is from 1 to 4; and said number of data memory modules m is from 1 to 4.

17. The memory system of claim 16, wherein n is greater than one and wherein fewer than n data memory modules are populated with memory devices.

18. The memory system of claim 17, wherein m is greater than one and wherein fewer than m data memory modules are populated with memory devices.

19. The memory system according to claim 14, wherein said memory controller comprises programmable control logic that generates supplemental addresses for said first and second status memory modules as a function of:

(a) a requested data memory module address;

(b) a maximum data memory module size;

(c) a maximum number of data memory modules; and (d) a number of status memory column address bits.

* * * * *